US012062260B2

(12) United States Patent
Kozuki et al.

(10) Patent No.: US 12,062,260 B2
(45) Date of Patent: Aug. 13, 2024

(54) VALUABLE-MEDIUM MONITORING SYSTEM, VALUABLE-MEDIUM MONITORING METHOD, SERVER, AND TERMINAL DEVICE

(71) Applicant: Glory Ltd., Himeji (JP)

(72) Inventors: Toshimitsu Kozuki, Himeji (JP); Ken Matsuhashi, Himeji (JP); Daisuke Yoshikawa, Himeji (JP); Nobuo Tsuruma, Himeji (JP)

(73) Assignee: GLORY LTD., Himeji (JP)

( * ) Notice: Subject to any disclaimer, the term of this patent is extended or adjusted under 35 U.S.C. 154(b) by 0 days.

(21) Appl. No.: 18/210,087

(22) Filed: Jun. 15, 2023

(65) Prior Publication Data

US 2023/0326281 A1 Oct. 12, 2023

Related U.S. Application Data

(63) Continuation of application No. PCT/JP2021/043845, filed on Nov. 30, 2021.

(30) Foreign Application Priority Data

Dec. 18, 2020 (JP) ................................ 2020-210508

(51) Int. Cl.
*G07D 11/30* (2019.01)
*G07D 7/00* (2016.01)

(52) U.S. Cl.
CPC ............... *G07D 11/30* (2019.01); *G07D 7/00* (2013.01)

(58) Field of Classification Search
CPC ................................ G07D 11/30; G07D 7/00
(Continued)

(56) References Cited

U.S. PATENT DOCUMENTS

2013/0120580 A1* 5/2013 Huang .................... G07D 7/12 348/150

FOREIGN PATENT DOCUMENTS

JP 2003-303367 A 10/2003
JP 2005-122500 A 5/2005
(Continued)

OTHER PUBLICATIONS

International Search Report and Written Opinion mailed on Feb. 8, 2022, received for PCT Application PCT/JP2021/043845, filed on Nov. 30, 2021, 9 pages including English Translation.

*Primary Examiner* — Daniel A Hess
(74) *Attorney, Agent, or Firm* — XSENSUS LLP

(57) ABSTRACT

A valuable-medium monitoring system of the present disclosure includes terminal devices and a server, the terminal devices each including a controller that extracts information on a valuable medium and determines whether or not the valuable medium is a circulation-unsuitable medium based on the extracted information on the valuable medium; and a transmitter that, in response to a determination that the valuable medium is a circulation-unsuitable medium, transmits information on the circulation-unsuitable medium to the server, the server including: a memory that stores pieces of information on circulation-unsuitable media, the pieces of information being grouped into groups; and a transmitter that, in response to transmission of information on a circulation-unsuitable medium from one of the terminal devices, transmits a specific group of information on a circulation-unsuitable medium to which the circulation-unsuitable medium corresponds to any other terminal devices satisfying a predetermined condition.

19 Claims, 21 Drawing Sheets

(58) Field of Classification Search
USPC .......................................................... 235/379
See application file for complete search history.

(56) References Cited

FOREIGN PATENT DOCUMENTS

| | | | |
|---|---|---|---|
| JP | 2013-254349 | A | 12/2013 |
| JP | 2017-151526 | A | 8/2017 |

* cited by examiner

FIG.7

| Serial number | Denomination | Group | Dye ink |
|---|---|---|---|
| ABC12345 | JPY10000 | 1 | ✓ |
| DEF123456 | USD100 | 2 | |
| GHI34567 | JPY1000 | | |
| KLM45678 | JPY10000 | 1 | ✓ |
| IUH13548 | USD100 | 3 | ✓ |
| IJI48521 | JPY5000 | 1 | ✓ |

| Serial number | Date and time | Latitude | Longitude | Factor |
|---|---|---|---|---|
| ABC12345 | 10/09 13:00:01 | 35.0351 | 139.5454 | |
| ABC12345 | 10/12 14:15:49 | 32.0515 | 134.2846 | |
| ABC12345 | 10/14 07:20:15 | 31.5852 | 130.1878 | |

| Serial number | Date and time | Latitude | Longitude | Factor |
|---|---|---|---|---|
| DEF123456 | 09/09 18:06:21 | 38.0351 | 142.5454 | Counterfeit |
| DEF123456 | 10/11 09:15:49 | 32.0515 | 132.2846 | Counterfeit |

VALUABLE-MEDIUM MONITORING SYSTEM, VALUABLE-MEDIUM MONITORING METHOD, SERVER, AND TERMINAL DEVICE

CROSS-REFERENCE TO RELATED APPLICATIONS

The present application is a Continuation Application of PCT Application No. PCT/JP2021/043845 filed on Nov. 30, 2021, which claims priority to Japanese Patent Application No. 2020-210508 filed on Dec. 18, 2020 under the Paris Convention and provisions of national law in a designated State. The entire contents of the application are hereby incorporated by reference.

TECHNICAL FIELD

The present disclosure relates to valuable-medium monitoring systems, valuable-medium monitoring methods, servers, and terminal devices.

BACKGROUND ART

Valuable media (e.g., banknotes) unsuitable for circulation as being involved in crime are treated as circulation-unsuitable media (e.g., counterfeit notes). One receiving such a medium possibly suffers a horrendous loss.

For example, JP 2003-303367 A discloses a banknote management system in which a banknote handling unit transmits the serial numbers of received banknotes to a computer server, and the computer server matches the transmitted serial numbers of the banknotes against serial numbers of banknotes in a database to notify the banknote handling unit of information about whether or not there is any problem related to the banknotes.

SUMMARY

Solution to Problem

One aspect of the present disclosure is directed to a valuable-medium monitoring system for detecting a circulation-unsuitable medium that is a valuable medium unsuitable for circulation as being involved in crime, the valuable-medium monitoring system including: a plurality of terminal devices; and a server configured to transmit information to and receive information from the plurality of terminal devices, the plurality of terminal devices each including: a controller; and a transmitter, the controller being configured to extract information on a valuable medium and determine whether or not the valuable medium is a circulation-unsuitable medium based on the extracted information on the valuable medium, the transmitter being configured, in response to a determination by the controller that the valuable medium is a circulation-unsuitable medium, to transmit information on the circulation-unsuitable medium to the server, the server including: a memory; and a transmitter, the memory being configured to store pieces of information on a plurality of circulation-unsuitable media, the pieces of information being grouped into a plurality of groups, the transmitter being configured, in response to transmission of information on a circulation-unsuitable medium from one of the plurality of terminal devices, to transmit a specific group of information on a circulation-unsuitable medium to which the circulation-unsuitable medium corresponds to any other of the plurality of terminal devices satisfying a predetermined condition.

Another aspect of the present disclosure is directed to a valuable-medium monitoring method for detecting a circulation-unsuitable medium that is a valuable medium unsuitable for circulation as being involved in crime, the valuable-medium monitoring method including: in one terminal device, extracting information on a valuable medium, determining whether or not the valuable medium is a circulation-unsuitable medium based on the extracted information on the valuable medium; and in response to a determination that the valuable medium is a circulation-unsuitable medium, transmitting information on the circulation-unsuitable medium to a server, and in the server, storing pieces of information on a plurality of circulation-unsuitable media, the pieces of information being grouped into a plurality of groups; and transmitting a specific group of information on a circulation-unsuitable medium to which the information on the circulation-unsuitable medium transmitted from the one terminal device corresponds to another terminal device satisfying a predetermined condition.

Yet another aspect of the present disclosure is directed to a server that transmits information to and receives information from a plurality of terminal devices for detecting a circulation-unsuitable medium that is a valuable medium unsuitable for circulation as being involved in crime, the server including: a memory; and a transmitter, the memory being configured to store pieces of information on a plurality of circulation-unsuitable media, the pieces of information being grouped into a plurality of groups, the transmitter being configured, in response to transmission of information on a circulation-unsuitable medium from one of the plurality of terminal devices, to transmit a specific group of information on a circulation-unsuitable medium to which the circulation-unsuitable medium corresponds to any other of the plurality of terminal devices satisfying a predetermined condition.

Yet another aspect of the present disclosure is directed to a terminal device that transmits information to and receives information from a server for detecting a circulation-unsuitable medium that is a valuable medium unsuitable for circulation as being involved in crime, the terminal device including: a controller; and a transmitter, the controller being configured to extract information on a valuable medium and determine whether or not the valuable medium is a circulation-unsuitable medium based on the extracted information on the valuable medium, the transmitter being configured, in response to a determination by the controller that the valuable medium is a circulation-unsuitable medium, to transmit information on the circulation-unsuitable medium to the server.

Yet another aspect of the present disclosure is directed to a valuable-medium monitoring system for detecting a circulation-unsuitable medium that is a valuable medium unsuitable for circulation as being involved in crime, the valuable-medium monitoring system including: a plurality of terminal devices; and a server configured to transmit information to and receive information from the plurality of terminal devices, the plurality of terminal devices each including: a transmitter configured to transmit image data of a valuable medium to the server, the server including: a controller; a memory; and a transmitter, the controller being configured to extract information on the valuable medium from the image data transmitted from each of the plurality of terminal devices and determine whether or not the valuable medium is a circulation-unsuitable medium based on the extracted information on the valuable medium, the memory being configured to store pieces of information on a plurality of circulation-unsuitable media, the pieces of information being grouped into a plurality of groups, the transmitter of the server being configured, in response to a determination by the controller that the valuable medium is a circulation-unsuitable medium, to transmit a specific group of information on a circulation-unsuitable medium to which the circulation-unsuitable medium corresponds to any other of the plurality of terminal devices satisfying a predetermined condition.

BRIEF DESCRIPTION OF DRAWINGS

FIG. 7 is a view schematically showing a list of circulation-unsuitable banknotes stored in a storage unit of the server according to the first embodiment.

DETAILED DESCRIPTION

Figure 1:
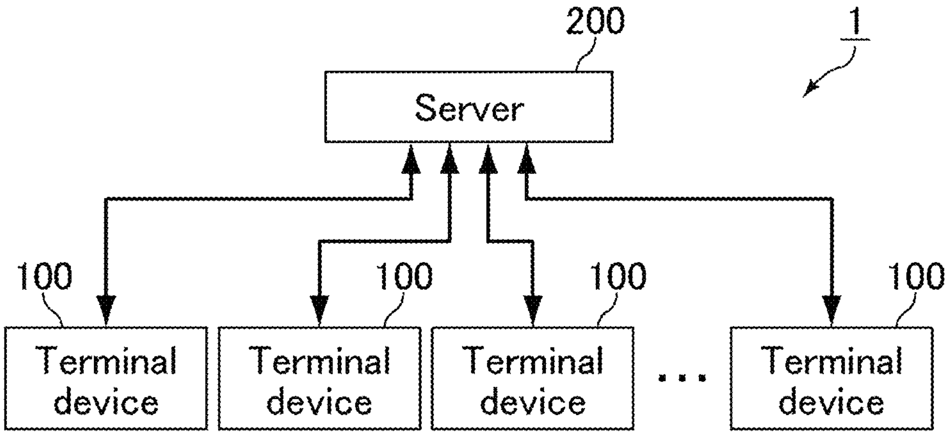
FIG. 1 is a block diagram showing the configuration of a banknote monitoring system according to a first embodiment.

The banknote management system disclosed in JP 2003-303367 A, however, still leaves room for improvement in that the system keeps the user of the banknotes waiting for a long time while the computer server matches many serial numbers transmitted from the banknote handling unit against the stored serial numbers.

In addition, it is impractical to store the information on all circulation-unsuitable media in a terminal device with a limited memory capacity.

In response to the above current state of the art, an object of the present disclosure is to provide a valuable-medium monitoring system, a valuable-medium monitoring method, a server, and a terminal device that can simply and efficiently detect a circulation-unsuitable medium while reducing the system load.

In order to solve the above issue and to achieve the object, one aspect of the present disclosure is directed to a valuable-medium monitoring system for detecting a circulation-unsuitable medium that is a valuable medium unsuitable for circulation as being involved in crime, the valuable-medium monitoring system including: a plurality of terminal devices; and a server configured to transmit information to and receive information from the plurality of terminal devices, the plurality of terminal devices each including: a controller; and a transmitter, the controller being configured to extract information on a valuable medium and determine whether or not the valuable medium is a circulation-unsuitable medium based on the extracted information on the valuable medium, the transmitter being configured, in response to a determination by the controller that the valuable medium is a circulation-unsuitable medium, to transmit information on the circulation-unsuitable medium to the server, the server including: a memory; and a transmitter, the memory being configured to store pieces of information on a plurality of circulation-unsuitable media, the pieces of information being grouped into a plurality of groups, the transmitter being configured, in response to transmission of information on a circulation-unsuitable medium from one of the plurality of terminal devices, to transmit a specific group of information on a circulation-unsuitable medium to which the circulation-unsuitable medium corresponds to any other of the plurality of terminal devices satisfying a predetermined condition.

The information on the valuable medium extracted by the controller may include at least one of country information, type information, face/back information, feature amount information included in image data, serial number information, or serial number font information, each of these pieces of information being about the valuable medium.

The information on the circulation-unsuitable medium may include information on the circulation-unsuitable medium itself.

The information on the circulation-unsuitable medium itself may include at least one of country information, type information, face/back information, or serial number information, each of these pieces of information being about the circulation-unsuitable medium.

The information on the circulation-unsuitable medium may include information associated with the circulation-unsuitable medium.

The information associated with the circulation-unsuitable medium may include at least one of date and time information, location information, or factor information, each of these pieces of information being about detection of the circulation-unsuitable medium by the one terminal device.

The information associated with the circulation-unsuitable medium may include at least one of age information or appearance feature information about a user of the circulation-unsuitable medium.

The transmitter of the server may transmit the specific group of information on a circulation-unsuitable medium to any of the plurality of terminal devices located in an area where the one terminal device has detected the circulation-unsuitable medium.

The transmitter of the server may transmit the specific group of information on a circulation-unsuitable medium to any of the plurality of terminal devices located at a store having a partnership with a store where the one terminal device has detected the circulation-unsuitable medium.

The transmitter of the server may transmit the specific group of information on a circulation-unsuitable medium to any of the plurality of terminal devices located within a predetermined distance from a location where the one terminal device has detected the circulation-unsuitable medium.

The transmitter of the server may transmit the specific group of information on a circulation-unsuitable medium every time the one terminal device detects the circulation-unsuitable medium or after a lapse of a predetermined period of time from when the one terminal device has detected the circulation-unsuitable medium.

The pieces of information on the plurality of circulation-unsuitable media stored in the memory may be grouped by case.

The pieces of information on the plurality of circulation-unsuitable media stored in the memory and grouped into the plurality of groups may be ranked by risk levels.

The pieces of information on the plurality of circulation-unsuitable media stored in the memory and grouped into the plurality of groups may be grouped by case and ranked.

The pieces of information on the plurality of circulation-unsuitable media stored in the memory and grouped into the plurality of groups may be ranked by at least one of the amount or number of circulation-unsuitable media.

The pieces of information on the plurality of circulation-unsuitable media stored in the memory and grouped into the plurality of groups may be grouped by case and ranked by at least one of the amount or number of circulation-unsuitable media.

In response to transmission of information on the circulation-unsuitable medium from the one terminal device, the server may raise the rank of the specific group of information on a circulation-unsuitable medium in terms of risk levels to a higher rank.

In response to transmission of information on the circulation-unsuitable medium from the one terminal device, the transmitter of the server may transmit information on a circulation-unsuitable medium belonging to the specific group and being ranked higher than a predetermined rank.

The server may lower the rank of a group of information on a circulation-unsuitable medium in terms of risk levels to a lower rank as the case related to the group becomes older.

The server may change the area to which the specific group of information on a circulation-unsuitable medium is to be transmitted according to the rank of the specific group of information on a circulation-unsuitable medium.

The server may be a cloud server.

Another aspect of the present disclosure is directed to a valuable-medium monitoring method for detecting a circulation-unsuitable medium that is a valuable medium unsuitable for circulation as being involved in crime, the valuable-medium monitoring method including: in one terminal device, extracting information on a valuable medium, determining whether or not the valuable medium is a circulation-unsuitable medium based on the extracted information on the valuable medium; and in response to a determination that the valuable medium is a circulation-unsuitable medium, transmitting information on the circulation-unsuitable medium to a server, and in the server, storing pieces of information on a plurality of circulation-unsuitable media, the pieces of information being grouped into a plurality of groups; and transmitting a specific group of information on a circulation-unsuitable medium to which the information on the circulation-unsuitable medium transmitted from the one terminal device corresponds to another terminal device satisfying a predetermined condition.

The information on the valuable medium extracted by the one terminal device may include at least one of country information, type information, face/back information, feature amount information included in image data, serial number information, or serial number font information, each of these pieces of information being about the valuable medium.

The information on the circulation-unsuitable medium may include information on the circulation-unsuitable medium itself.

The information on the circulation-unsuitable medium itself may include at least one of country information, type information, face/back information, or serial number information, each of these pieces of information being about the circulation-unsuitable medium.

The information on the circulation-unsuitable medium may include information associated with the circulation-unsuitable medium.

The information associated with the circulation-unsuitable medium may include at least one of date and time information, location information, or factor information, each of these pieces of information being about detection of the circulation-unsuitable medium by the one terminal device.

The information associated with the circulation-unsuitable medium may include at least one of age information or appearance feature information about a user of the circulation-unsuitable medium.

The server may transmit the specific group of information on a circulation-unsuitable medium to a terminal device located in an area where the one terminal device has detected the circulation-unsuitable medium.

The server may transmit the specific group of information on a circulation-unsuitable medium to a terminal device located at a store having a partnership with a store where the one terminal device has detected the circulation-unsuitable medium.

The server may transmit the specific group of information on a circulation-unsuitable medium to a terminal device located within a predetermined distance from a location where the one terminal device has detected the circulation-unsuitable medium.

The server may transmit the specific group of information on a circulation-unsuitable medium every time the one terminal device detects the circulation-unsuitable medium or after a lapse of a predetermined period of time from when the one terminal device has detected the circulation-unsuitable medium.

The pieces of information on the plurality of circulation-unsuitable media stored in the server may be grouped by case.

The pieces of information on the plurality of circulation-unsuitable media stored in the server and grouped into the plurality of groups may be ranked by risk levels.

The pieces of information on the plurality of circulation-unsuitable media stored in the server and grouped into the plurality of groups may be grouped by case and ranked.

The pieces of information on the plurality of circulation-unsuitable media stored in the server and grouped into the plurality of groups may be ranked by at least one of the amount or number of circulation-unsuitable media.

The pieces of information on the plurality of circulation-unsuitable media stored in the server and grouped into the plurality of groups may be grouped by case and ranked by at least one of the amount or number of circulation-unsuitable media.

In response to transmission of information on the circulation-unsuitable medium from the one terminal device, the server may raise the rank of the specific group of information on a circulation-unsuitable medium in terms of risk levels to a higher rank.

In response to transmission of information on the circulation-unsuitable medium from the one terminal device, the server may transmit information on a circulation-unsuitable medium belonging to the specific group and being ranked higher than a predetermined rank.

The server may lower the rank of a group of information on a circulation-unsuitable medium in terms of risk levels to a lower rank as the case related to the group becomes older.

The server may change the area to which the specific group of information on a circulation-unsuitable medium is to be transmitted according to the rank of the specific group of information on a circulation-unsuitable medium.

The server may be a cloud server.

Yet another aspect of the present disclosure is directed to a server that transmits information to and receives information from a plurality of terminal devices for detecting a circulation-unsuitable medium that is a valuable medium unsuitable for circulation as being involved in crime, the server including: a memory; and a transmitter, the memory being configured to store pieces of information on a plurality of circulation-unsuitable media, the pieces of information being grouped into a plurality of groups, the transmitter being configured, in response to transmission of information on a circulation-unsuitable medium from one of the plurality of terminal devices, to transmit a specific group of information on a circulation-unsuitable medium to which the circulation-unsuitable medium corresponds to any other of the plurality of terminal devices satisfying a predetermined condition.

The information on the circulation-unsuitable medium may include information on the circulation-unsuitable medium itself.

The information on the circulation-unsuitable medium itself may include at least one of country information, type information, face/back information, or serial number information, each of these pieces of information being about the circulation-unsuitable medium.

The information on the circulation-unsuitable medium may include information associated with the circulation-unsuitable medium.

The information associated with the circulation-unsuitable medium may include at least one of date and time information, location information, or factor information, each of these pieces of information being about detection of the circulation-unsuitable medium by the one terminal device.

The information associated with the circulation-unsuitable medium may include at least one of age information or appearance feature information about a user of the circulation-unsuitable medium.

The transmitter may transmit the specific group of information on a circulation-unsuitable medium to any of the plurality of terminal devices located in an area where the one terminal device has detected the circulation-unsuitable medium.

The transmitter may transmit the specific group of information on a circulation-unsuitable medium to any of the plurality of terminal devices located at a store having a partnership with a store where the one terminal device has detected the circulation-unsuitable medium.

The transmitter may transmit the specific group of information on a circulation-unsuitable medium to any of the plurality of terminal devices located within a predetermined distance from a location where the one terminal device has detected the circulation-unsuitable medium.

The transmitter may transmit the specific group of information on a circulation-unsuitable medium every time the one terminal device detects the circulation-unsuitable medium or after a lapse of a predetermined period of time from when the one terminal device has detected the circulation-unsuitable medium.

The pieces of information on the plurality of circulation-unsuitable media stored in the memory may be grouped by case.

The pieces of information on the plurality of circulation-unsuitable media stored in the memory and grouped into the plurality of groups may be ranked by risk levels.

The pieces of information on the plurality of circulation-unsuitable media stored in the memory and grouped into the plurality of groups may be grouped and ranked.

The pieces of information on the plurality of circulation-unsuitable media stored in the memory and grouped into the plurality of groups may be ranked by at least one of the amount or number of circulation-unsuitable media.

The pieces of information on the plurality of circulation-unsuitable media stored in the memory and grouped into the plurality of groups may be grouped by case and ranked by at least one of the amount or number of circulation-unsuitable media.

In response to transmission of information on the circulation-unsuitable medium from the one terminal device, the server may raise the rank of the specific group of information on a circulation-unsuitable medium in terms of risk levels to a higher rank.

In response to transmission of information on the circulation-unsuitable medium from the one terminal device, the server may transmit information on a circulation-unsuitable medium belonging to the specific group and being ranked higher than a predetermined rank.

The server may lower the rank of a group of information on a circulation-unsuitable medium in terms of risk levels to a lower rank as the case related to the group becomes older.

The server may change the area to which the specific group of information on a circulation-unsuitable medium is to be transmitted according to the rank of the specific group of information on a circulation-unsuitable medium.

The server may be a cloud server.

Yet another aspect of the present disclosure is directed to a terminal device that transmits information to and receives information from a server for detecting a circulation-unsuitable medium that is a valuable medium unsuitable for circulation as being involved in crime, the terminal device including: a controller; and a transmitter, the controller being configured to extract information on a valuable medium and determine whether or not the valuable medium is a circulation-unsuitable medium based on the extracted information on the valuable medium, the transmitter being configured, in response to a determination by the controller that the valuable medium is a circulation-unsuitable medium, to transmit information on the circulation-unsuitable medium to the server.

The information on the valuable medium extracted by the controller may include at least one of country information, type information, face/back information, feature amount information included in image data, serial number information, or serial number font information, each of these pieces of information being about the valuable medium.

The information on the circulation-unsuitable medium may include information on the circulation-unsuitable medium itself.

The information on the circulation-unsuitable medium itself may include at least one of country information, type information, face/back information, or serial number information, each of these pieces of information being about the circulation-unsuitable medium.

The information on the circulation-unsuitable medium may include information associated with the circulation-unsuitable medium.

The information associated with the circulation-unsuitable medium may include at least one of date and time information, location information, or factor information, each of these pieces of information being about detection of the circulation-unsuitable medium by the terminal device.

The information associated with the circulation-unsuitable medium may include at least one of age information or appearance feature information about a user of the circulation-unsuitable medium.

Yet another aspect of the present disclosure is directed to a valuable-medium monitoring system for detecting a circulation-unsuitable medium that is a valuable medium unsuitable for circulation as being involved in crime, the valuable-medium monitoring system including: a plurality of terminal devices; and a server configured to transmit information to and receive information from the plurality of terminal devices, the plurality of terminal devices each including: a transmitter configured to transmit image data of a valuable medium to the server, the server including: a controller; a memory; and a transmitter, the controller being configured to extract information on the valuable medium from the image data transmitted from each of the plurality of terminal devices and determine whether or not the valuable medium is a circulation-unsuitable medium based on the extracted information on the valuable medium, the memory being configured to store pieces of information on a plurality of circulation-unsuitable media, the pieces of information being grouped into a plurality of groups, the transmitter of the server being configured, in response to a determination by the controller that the valuable medium is a circulation-unsuitable medium, to transmit a specific group of information on a circulation-unsuitable medium to which the circulation-unsuitable medium corresponds to any other of the plurality of terminal devices satisfying a predetermined condition.

The information on the valuable medium extracted by the controller may include at least one of country information, type information, face/back information, feature amount information included in image data, serial number information, or serial number font information, each of these pieces of information being about the valuable medium.

The information on the circulation-unsuitable medium may include information on the circulation-unsuitable medium itself.

The information on the circulation-unsuitable medium itself may include at least one of country information, type information, face/back information, or serial number information, each of these pieces of information being about the circulation-unsuitable medium.

The information on the circulation-unsuitable medium may include information associated with the circulation-unsuitable medium.

The information associated with the circulation-unsuitable medium may include at least one of date and time information, location information, or factor information, each of these pieces of information being about detection of the circulation-unsuitable medium by the terminal device.

The information associated with the circulation-unsuitable medium may include at least one of age information or appearance feature information about a user of the circulation-unsuitable medium.

The transmitter of the server may transmit the specific group of information on a circulation-unsuitable medium to any of the plurality of terminal devices located in an area where the terminal device has detected the circulation-unsuitable medium.

The transmitter of the server may transmit the specific group of information on a circulation-unsuitable medium to any of the plurality of terminal devices located at a store having a partnership with a store where the terminal device has detected the circulation-unsuitable medium.

The transmitter of the server may transmit the specific group of information on a circulation-unsuitable medium to any of the plurality of terminal devices located within a predetermined distance from a location where the terminal device has detected the circulation-unsuitable medium.

The transmitter of the server may transmit the specific group of information on a circulation-unsuitable medium every time the terminal device detects the circulation-unsuitable medium or after a lapse of a predetermined period of time from when the terminal device has detected the circulation-unsuitable medium.

The pieces of information on the plurality of circulation-unsuitable media stored in the memory may be grouped by case.

The pieces of information on the plurality of circulation-unsuitable media stored in the memory and grouped into the plurality of groups may be ranked by risk levels.

The pieces of information on the plurality of circulation-unsuitable media stored in the memory and grouped into the plurality of groups may be grouped by case and ranked.

The pieces of information on the plurality of circulation-unsuitable media stored in the memory and grouped into the plurality of groups may be ranked by at least one of the amount or number of circulation-unsuitable media.

The pieces of information on the plurality of circulation-unsuitable media stored in the memory and grouped into the plurality of groups may be grouped by case and ranked by at least one of the amount or number of circulation-unsuitable media.

In response to transmission of information on the circulation-unsuitable medium from the terminal device, the server may raise the rank of the specific group of information on a circulation-unsuitable medium in terms of risk levels to a higher rank.

In response to transmission of information on the circulation-unsuitable medium from the terminal device, the transmitter of the server may transmit information on a circulation-unsuitable medium belonging to the specific group and being ranked higher than a predetermined rank.

The server may lower the rank of a group of information on a circulation-unsuitable medium in terms of risk levels to a lower rank as the case related to the group becomes older.

The server may change the area to which the specific group of information on a circulation-unsuitable medium is to be transmitted according to the rank of the specific group of information on a circulation-unsuitable medium.

The server may be a cloud server.

The present disclosure can provide a valuable-medium monitoring system, a valuable-medium monitoring method, a server, and a terminal device that can simply and efficiently detect a circulation-unsuitable medium while reducing the system load.

Hereinafter, embodiments of a valuable-medium monitoring system, a valuable-medium monitoring method, a server, and a terminal device according to the present disclosure are described with reference to the drawings. Various valuable media such as banknotes, checks, vouchers, bills, business forms, documents of value, and card-like media are applicable as valuable media used in the present disclosure. Banknote monitoring systems, banknote monitoring methods, servers, and terminal devices for banknotes are used hereinbelow as examples to describe the present disclosure. Also, the following describes examples of a banknote monitoring system, a banknote monitoring method, a server, and a terminal device.

Herein, a “circulation-unsuitable medium (banknote)” is a valuable medium (banknote) unsuitable for circulation as being involved in crime. In other words, such a medium refers to a valuable medium (banknote) unsuitable for circulation in the market as it relates to an act prohibited by a law such as a criminal law. Thus, any banknote determined to be a genuine note and an unfit note does not correspond to a circulation-unsuitable banknote.

Here, “crime” includes, for example, counterfeiting or thieving a valuable medium (including robbery) and kidnapping accompanied with a ransom payment. Examples of the “circulation-unsuitable banknote” include counterfeit notes, suspect notes, stolen banknotes (bait money), and stolen banknotes (banknotes with a theft mark).

Counterfeit notes are common fake notes which include, for example, both a banknote with a serial number on a blacklist or the like and a banknote determined to be a fake note due to an obviously abnormal security element (e.g., infrared feature and/or magnetic feature) by a banknote recognition device.

Suspect notes include a banknote determined to be suspicious of being a fake note due to its security element at a lower level of abnormality than a counterfeit note by a banknote recognition device.

Stolen banknotes (bait money) refer to traceable banknotes handed over to a robber or the like who has broken into a bank.

Stolen banknotes (banknotes with a theft mark) refer to banknotes stolen through destruction of an ATM or the like and provided with a theft mark as an indication of theft. Examples of the theft mark include those obtained by applying a special ink called a dye ink to a banknote.

The same components or components having similar functions in the following description are commonly assigned with the same reference sign among different embodiments and drawings as appropriate, and description thereof is omitted as appropriate.

First Embodiment

FIG. 1 is a block diagram showing the configuration of a banknote monitoring system according to a first embodiment. A banknote monitoring system 1 according to the present embodiment is a system for detecting circulation-unsuitable banknotes, and includes, as shown in FIG. 1, terminal devices 100 and a server 200 that transmits information to and receives information from the terminal devices 100. Each of the terminal devices 100 and the server 200 are communicatively connected to each other over a communication network such as a local area network (LAN), a wide area network (WAN), or the Internet.

Figure 2:
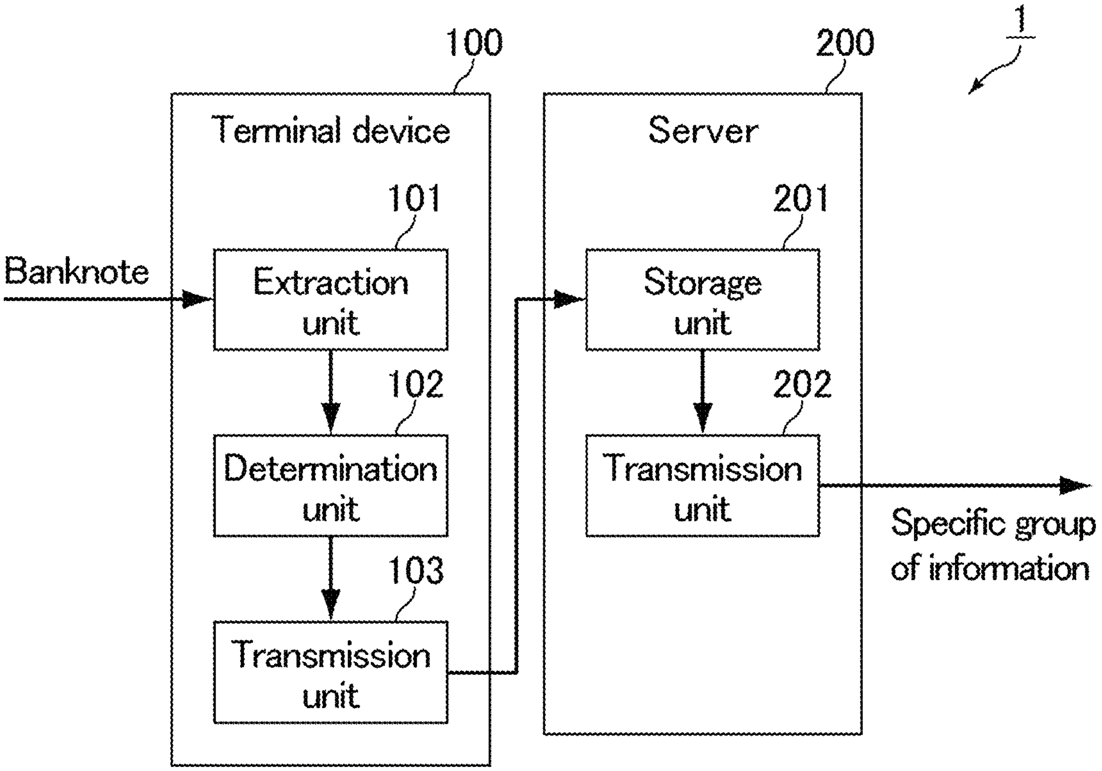
FIG. 2 is another block diagram showing the configuration of the banknote monitoring system according to the first embodiment.

FIG. 2 is another block diagram showing the configuration of the banknote monitoring system according to the first embodiment. Each of the terminal devices 100 is capable of detecting a circulation-unsuitable banknote from among circulated banknotes, and includes, as shown in FIG. 2, an extraction unit 101, a determination unit 102, and a transmission unit (transmitter) 103.

The extraction unit 101 is configured to extract (acquires) information on each banknote. Specifically, for example, the extraction unit 101 recognizes the country, denomination, face/back, and serial number of the banknote based on image data of the banknote, and thus acquires information indicating these results.

The determination unit 102 is configured to determine whether or not a banknote is a circulation-unsuitable banknote based on the information on the banknote extracted by the extraction unit 101. This allows detection of a circulation-unsuitable banknote from among circulated banknotes. The determination unit 102 determines whether or not a banknote is a circulation-unsuitable banknote based on, for example, the country information, denomination information, face/back information, and serial number information about the banknote extracted by the extraction unit 101. Determination units 102 of different terminal devices 100 may execute different determination processings depending on the model, generation, and use of the terminal devices 100.

If the determination unit 102 has determined that the banknote is a circulation-unsuitable banknote, then the transmission unit 103 transmits information on the circulation-unsuitable banknote (e.g., country, denomination, face/back, serial number, factor, date and time of detection, location of detection) to the server 200. The transmission unit 103 is connected to a communication network to transmit information by wired communications or wireless communications, and may include a network interface card and the like or may be defined by a transmitter or an antenna, for example. The transmission unit 103 may transmit information on the terminal device 100 (e.g., model, unit number, the model of the recognition unit (unnecessary if recognizable from the unit number)) as well as the information on the circulation-unsuitable banknote to the server 200. The information (data) including information on a circulation-unsuitable banknote is output by the later-described control unit 106 to the transmission unit 103 and then transmitted by the transmission unit 103. The control unit 106 executes the processing of determining and deciding the timing, the contents (e.g., contents of the information on the circulation-unsuitable banknote), the range (destinations), and other conditions of transmission which is to be executed by the transmission unit 103. For example, if the determination unit 102 has determined that a banknote is a circulation-unsuitable banknote, then the control unit 106 executes transmission processing of transmitting information on the circulation-unsuitable banknote to the server 200 via the transmission unit 103.

The server 200 is configured such that, if information on a circulation-unsuitable banknote has been transmitted from a terminal device 100, then the server 200 transmits a specific group of information on circulation-unsuitable banknote(s) to which the circulation-unsuitable banknote corresponds to other terminal device(s) 100 satisfying a predetermined condition. The server 200 includes, as shown in FIG. 2, a storage unit (memory) 201 and a transmission unit (controller) 202.

The storage unit 201 is a database that stores pieces of information on circulation-unsuitable banknotes grouped into a plurality of groups. The pieces of information may be grouped by case, for example. In other words, the server 200 may manage pieces of information on circulation-unsuitable banknotes in the storage unit 201 by grouping the pieces of information by case.

The storage unit 201 is defined by, for example, random access memory (RAM), read only memory (ROM), flash memory, hard disk drive (HDD), solid state drive (SSD), and/or other storage or memory devices. The storage unit 201 allows reading and writing of data and programs.

Figure 3:
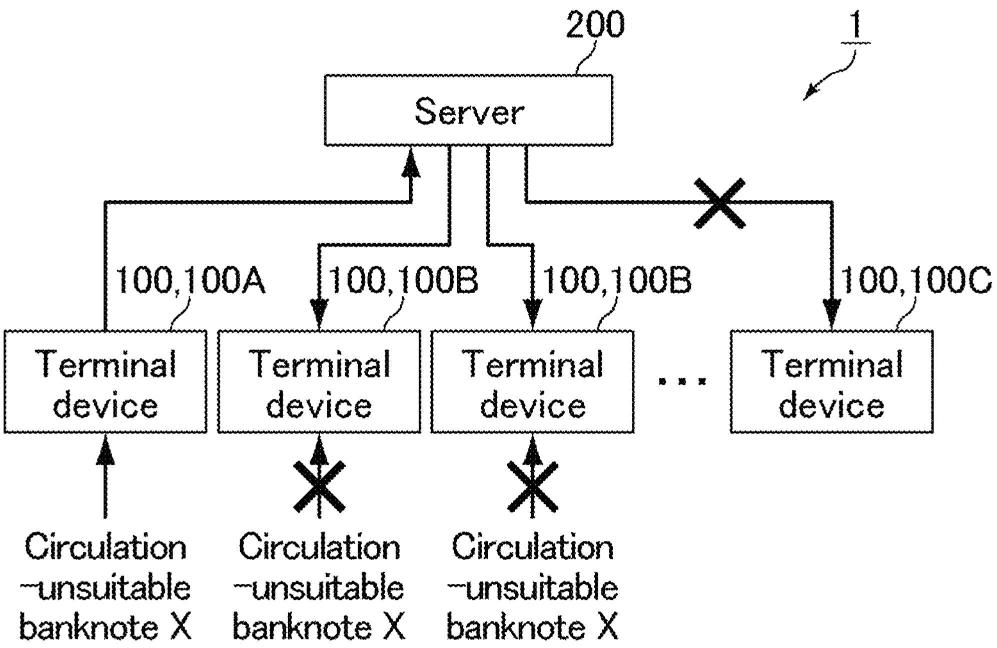
FIG. 3 is a block diagram showing the operation of the banknote monitoring system according to the first embodiment.

FIG. 3 is a block diagram showing the operation of the banknote monitoring system according to the first embodiment. As shown in FIG. 3, if information on a circulation-unsuitable banknote X has been transmitted from a terminal device 100 (terminal device 100A in FIG. 3), then the transmission unit 202 (not shown in FIG. 3) of the server 200 transmits a specific group of information (e.g., serial number information) on circulation-unsuitable banknotes including the circulation-unsuitable banknote X to other terminal devices 100 satisfying a predetermined condition (terminal devices 100B in FIG. 3). Since the server 200 can transmit the information on the circulation-unsuitable banknote X and the information on circulation-unsuitable banknotes in the same group as the circulation-unsuitable banknote X to the terminal devices 100B, the terminal devices 100B can correctly (with high accuracy) detect the circulation-unsuitable banknote X and any circulation-unsuitable banknotes related to the circulation-unsuitable banknote X, e.g., circulation-unsuitable banknotes with the same serial number.

The transmission unit 202 is connected to a communication network to transmit information by wired communications, and includes a network interface card and the like. A variety of information (data) including a specific group of information on circulation-unsuitable banknote(s) is output to the transmission unit 202 by the later-described control unit 203 and then transmitted by the transmission unit 202. The control unit 203 executes the processing of determining and deciding the timing, the contents (e.g., contents of the specific group of information on circulation-unsuitable banknote(s)), the range (destinations, e.g., terminal devices 100B satisfying the predetermined condition), and other conditions of transmission which is to be executed by the transmission unit 202. For example, if information on the circulation-unsuitable banknote X has been transmitted from the terminal device 100A, then the control unit 203 executes transmission processing of transmitting a specific group of information on circulation-unsuitable banknote(s) to which the circulation-unsuitable banknote X corresponds to the terminal devices 100B satisfying the predetermined condition via the transmission unit 202.

Figure 4:
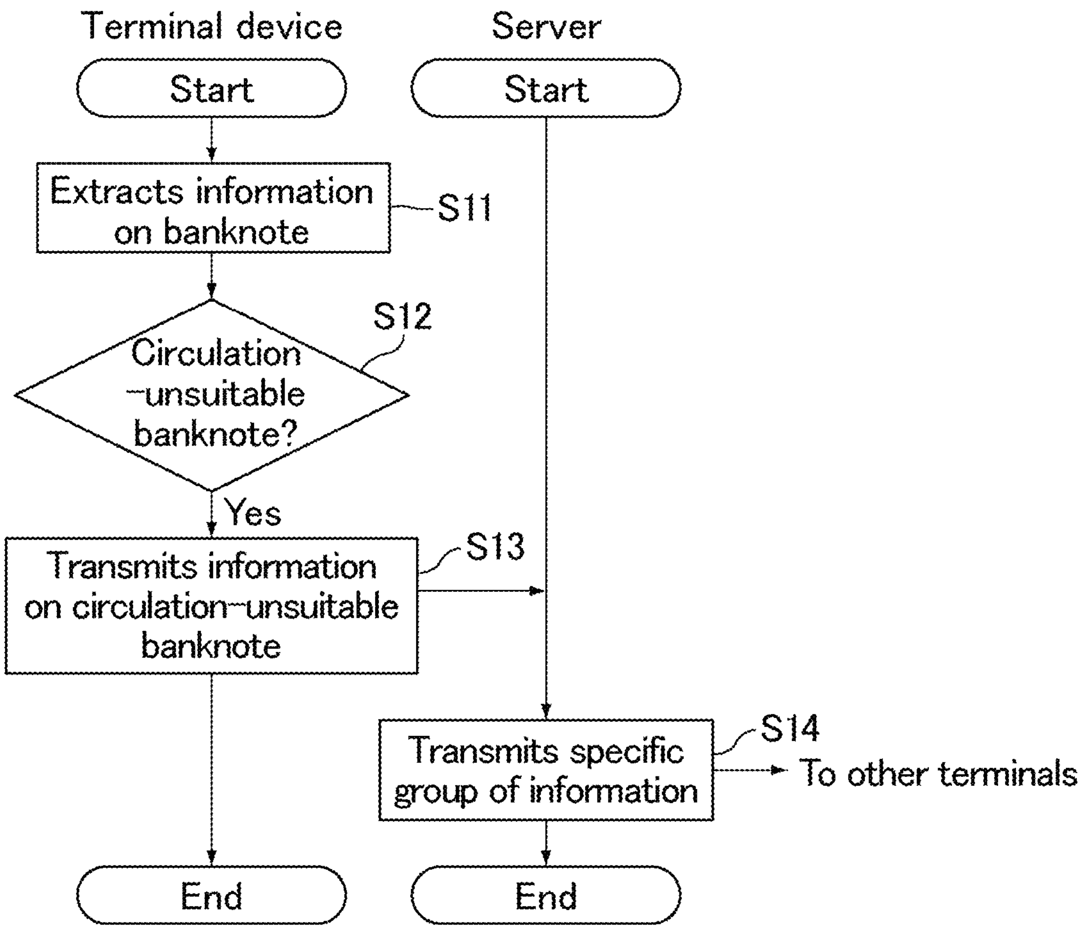
FIG. 4 is a flowchart showing an example of the operation of the banknote monitoring system according to the first embodiment.

Next, the operation of the banknote monitoring system according to the present embodiment is described with reference to FIG. 4. FIG. 4 is a flowchart showing an example of the operation of the banknote monitoring system according to the first embodiment.

As shown in FIG. 4, first, the extraction unit 101 of a terminal device 100 extracts information on a banknote (step S11).

Next, the determination unit 102 of the terminal device 100 determines whether or not the banknote is a circulation-unsuitable banknote based on the information on the banknote extracted by the extraction unit 101 (step S12).

If the banknote has been determined to be a circulation-unsuitable banknote (step S12: Yes), then the transmission unit 103 of the terminal device 100 transmits information on the circulation-unsuitable banknote to the server 200 (step S13). In this case, the terminal device 100 may notify the user of the determination that the banknote is a circulation-unsuitable banknote.

If in step S12 the banknote has been determined not to be a circulation-unsuitable banknote, then the terminal device 100 may notify the user of the determination.

If information on the circulation-unsuitable banknote has been transmitted to the server 200, then the transmission unit 202 of the server 200 transmits to other terminal device(s) 100 satisfying a predetermined condition a specific group of information on circulation-unsuitable banknote(s) to which the circulation-unsuitable banknote, whose information has been transmitted from the terminal device 100, corresponds (step S14). This completes the operation of the system 1.

In the present embodiment, not the server 200 but the determination unit 102 of each terminal device 100 determines whether or not a banknote is a circulation-unsuitable banknote. This allows detection of a circulation-unsuitable banknote from among circulated banknotes more simply in a shorter time than in cases where the determination process is executed by the server 200.

Also, since a specific group of information on circulation-unsuitable banknote(s) to which a circulation-unsuitable banknote X detected by a terminal device 100A (e.g., mobile terminal) corresponds is transmitted to terminal device(s) 100B satisfying a predetermined condition, information on the circulation-unsuitable banknote X and information on circulation-unsuitable banknotes related to the banknote X, i.e., information on circulation-unsuitable banknotes with a high risk level and high priority, can be transmitted only to terminal device(s) 100 with a high risk level and high priority. For example, information on circulation-unsuitable banknotes used by the same criminal person or criminal organization as the user of the circulation-unsuitable banknote X can be transmitted to terminal device(s) 100B located at a short distance from the terminal device 100A that has detected the circulation-unsuitable banknote X. This can effectively reduce the risk that the user of a terminal device 100B receives the circulation-unsuitable banknote X and a circulation-unsuitable banknote related to the circulation-unsuitable banknote X (e.g., circulation-unsuitable banknote with the same serial number).

Meanwhile, the specific group of information on circulation-unsuitable banknote(s) is not transmitted to other terminal device(s) 100 (e.g., terminal device 100C in FIG. 3) not satisfying the predetermined condition. This can prevent excessive memory consumption in a terminal device 100 with a low risk level and low priority. Also, information on circulation-unsuitable banknotes in groups not including the circulation-unsuitable banknote X detected by the terminal device 100A (e.g., mobile terminal) is not transmitted to terminal devices 100B and 100C. From this viewpoint, too, the above configuration can reduce memory consumption in the terminal devices 100B and 100C. Thus, load on the entire system can be reduced.

As described above, the banknote monitoring system 1 of the present embodiment can simply and efficiently detect a circulation-unsuitable banknote while reducing the system load.

Next, more specific modes of the terminal devices 100 and the server 200 according to the present embodiment are described.

Each terminal device 100 may be a stationary terminal device or a mobile terminal device.

Examples of the stationary terminal device include cash register change dispensers, automatic teller machines (ATMs), money changers, teller machines, teller cashiers, banknote counters, banknote organizers, automatic settlement machines, KIOSKs, vending machines, ticket vending machines, and other banknote handing devices. Teller machines execute a variety of processing including deposit processing and withdrawal processing, and are typically installed at branches of banks or other financial institutions. Teller cashiers execute deposit processing and withdrawal processing at teller windows in branches and are typically installed at teller windows in branches of financial institutions and communicatively connected to teller machines.

Examples of the mobile terminal devices include mobile terminals (e.g., laptops computers, tablet computers, smartphones, and mobile phones) and wearable terminals (e.g., smartwatches, smartglasses) which have a camera, external communication, display, location information, and other functions.

Figure 5:
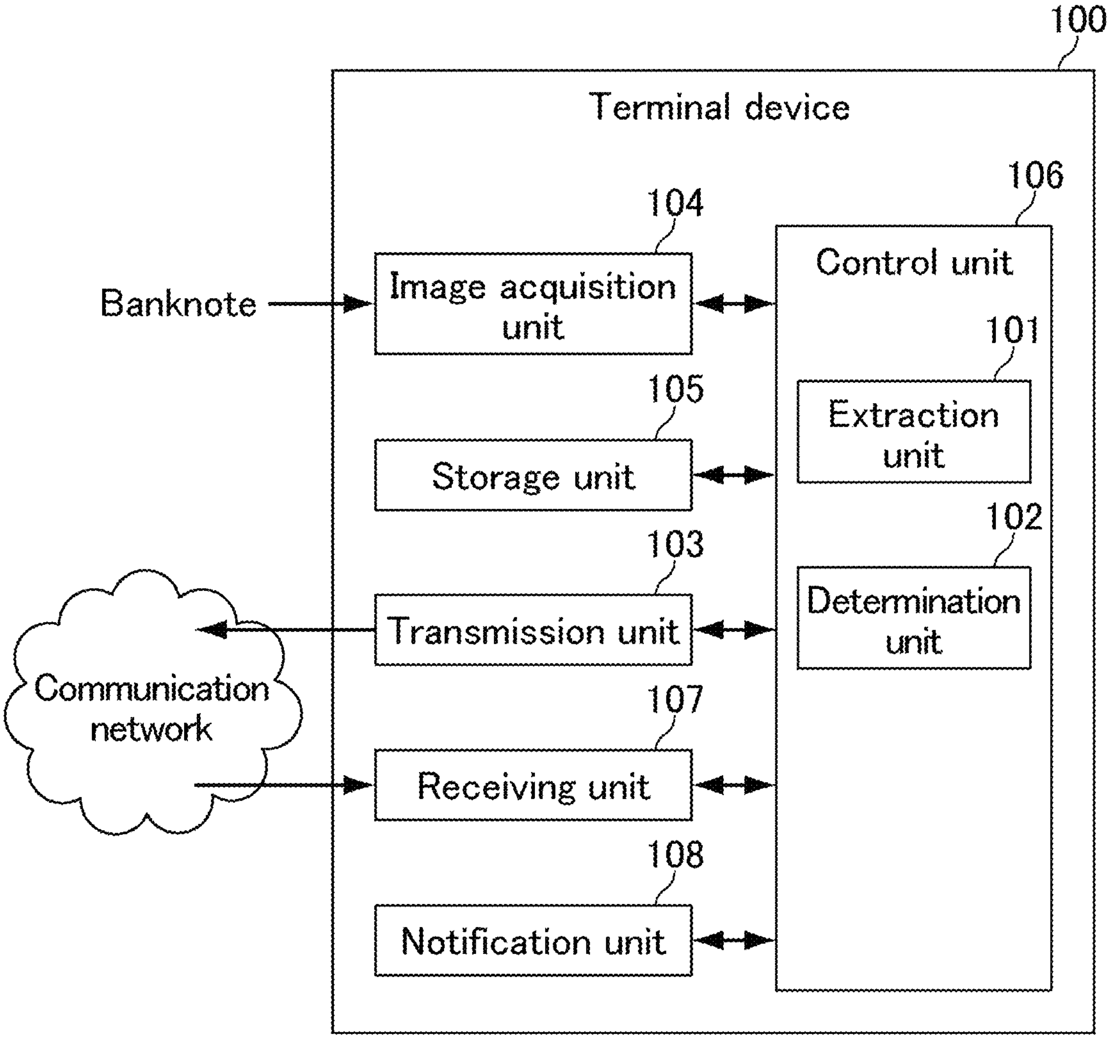
FIG. 5 is a block diagram showing the configuration of a terminal device according to the first embodiment.

FIG. 5 is a block diagram showing the configuration of a terminal device according to the first embodiment. Each terminal device 100 may further include an image acquisition unit 104, a storage unit 105, a control unit (arithmetic processing unit) 106, a receiving unit 107, and a notification unit 108 as shown in FIG. 5 as well as the extraction unit 101, the determination unit 102, and the transmission unit 103 described above.

Also, each terminal device 100 may include a magnetic detection unit (e.g., magnetic line sensor) that acquires magnetic data (magnetism) of a banknote, a thickness detection unit (e.g., thickness detecting line sensor) that acquires thickness data (thickness features) of a banknote, a fluorescence detection unit (e.g., a light source that emits excitation light and an optical sensor that receives fluorescence) that acquires fluorescence data (fluorescence features) of a banknote by emitting excitation light such as ultraviolet rays, and a phosphorescence detection unit (e.g., a light source that emits excitation light and an optical sensor that receives phosphorescence) that acquires phosphorescence data (phosphorescence features) of a banknote by emitting excitation light such as ultraviolet rays.

Each terminal device 100 may include a location detection unit that detects the location (e.g., latitude and longitude) of the terminal device 100. The location detection unit detects the location using a global navigation satellite system (GNSS) and is defined by, for example, a Global Positioning System (GPS) sensor (GPS module).

Each terminal device 100 may also include a real-time clock (RTC) unit that outputs a clock signal indicating the measured time. The RTC unit keeps measuring the passage of time by power supply from a source of power or from an auxiliary source of power (e.g., primary battery) while the terminal device 100 is turned off. The RTC unit includes a crystal oscillator or another oscillator.

Each terminal device 100 may also include an LCD panel, an organic EL panel, or another display unit; a touchscreen, an input button, or another input unit; a printer or another output unit; a speaker or another audio output unit; a microphone or another audio input unit; and a vibration motor or another a vibration generator.

The image acquisition unit 104 captures an image of a banknote. Specifically, the image acquisition unit 104 generates image data of a banknote. A still image and/or a moving image of the banknote can be generated from the generated image data. An image acquired by the image acquisition unit 104 may be a visible image based on visible light or an invisible image based on infrared light or other invisible light. The image acquisition unit 104 can be, for example, an optical line sensor or a camera module. The image acquisition unit 104 may include, as the light source, light sources that can emit visible light, infrared light, and other types of lights (lights with different wavelengths).

The storage unit 105 may be defined by, for example, RAM, ROM, flash memory, SSD, and/or other storage or memory devices. The storage unit 105 allows reading and writing of data and programs.

The control unit 106 is a controller that controls members of the terminal device 100 and is defined by, for example, programs for executing various processings, a central processing unit (CPU) that executes the programs, and various hardware devices (e.g., field programmable gate array (FPGA)) controlled by the CPU.

The control unit 106 can function as the extraction unit 101 and the determination unit 102 by executing the corresponding programs.

Based on the image data of the banknote generated by the image acquisition unit 104, the extraction unit 101 may extract (acquire) information on the banknote.

The information on the banknote extracted by the extraction unit 101 may include at least one of country information, denomination information, face/back information, feature amount information included in image data, serial number information, or serial number font information, each of these pieces of information being about the banknote.

Examples of the feature amount information included in image data of the banknote extracted by the extraction unit 101 include information on the feature amount of a visible image and/or an invisible image of the banknote.

The above pieces of information are acquirable, for example, from image data of the banknote (the data may be data generated by the image acquisition unit 104) by an ordinary technique.

The country information means information indicating the country (which may be a region) of issue of the banknote. The denomination information means information indicating the type (i.e., denomination) of the banknote. The face/back information means information indicating whether the banknote is placed face up or face down. The serial number information means information indicating the serial number, i.e., the character string (the set of numbers) of the serial number.

The extraction unit 101, based on data acquired by the magnetic detection unit, the thickness detection unit, the fluorescence detection unit, the phosphorescence detection unit, or another unit, may further extract (acquire) information (characteristics of the features) on the banknote.

The determination unit 102 may determine whether or not a banknote is a circulation-unsuitable banknote by matching the serial number information about the banknote extracted by the extraction unit 101 against serial number information about circulation-unsuitable banknotes stored in the storage unit 105. In other words, if finding a match from the serial numbers of the circulation-unsuitable banknotes stored in the storage unit 105, then the determination unit 102 may determine the banknote to be a circulation-unsuitable banknote. Meanwhile, if finding no match from the serial numbers of the circulation-unsuitable banknotes stored in the storage unit 105, then the determination unit 102 may determine the banknote not to be a circulation-unsuitable banknote.

Also, the determination unit 102 may respectively match the country information, denomination information, face/back information, serial number information, and serial number font information about the banknote extracted by the extraction unit 101 against country information, denomination information, face/back information, serial number information, and serial number font information about circulation-unsuitable banknotes stored in the storage unit 105. If finding a circulation-unsuitable banknote with all these pieces of information matched, then the determination unit 102 may determine the banknote to be a circulation-unsuitable banknote. If finding no circulation-unsuitable banknote with all these pieces of information matched, then the determination unit 102 may determine the banknote not to be a circulation-unsuitable banknote. The information to be matched may further include feature amount information in an image.

The determination unit 102, based on the magnetism or thickness feature, fluorescence feature, and phosphorescence feature of a banknote, may execute determination processing of determining whether or not the banknote is a circulation-unsuitable banknote.

The amount of information stored in the storage unit 105 and used in matching processing executed by the determination unit 102 may be smaller than the amount of information stored in a storage unit 503 of a server 500 and used in matching processing executed by a determination unit 502 of the server 500 in a fourth embodiment described later.

The algorithm of the determination processing executed by the determination unit 102 may be substantially the same as or different from the algorithm of the determination processing executed by the determination unit 502 of the server 500 in the fourth embodiment described later. For example, the algorithm of the determination processing executed by the determination unit 502 may be an algorithm covering all the algorithms of the determination processings executed by the determination units 102 of the terminal devices 100, or may be an algorithm for executing more detailed determination processing than the algorithm of the determination processing executed by the determination unit 102 of each terminal device 100.

The determination unit 102 may detect a circulation-unsuitable banknote based on a specific group of information on circulation-unsuitable banknote(s) transmitted from the server 200. In other words, a terminal device 100B, based on a specific group of information on circulation-unsuitable banknote(s) transmitted from the server 200, may determine whether or not the banknote is a circulation-unsuitable banknote. In this case, the determination unit 102 determines whether or not the banknote is a circulation-unsuitable banknote based on the specific group of information on circulation-unsuitable banknote(s) transmitted from the server 200 and the information on the banknote extracted by the extraction unit 101. For example, the determination unit 102 matches the serial number information about the banknote extracted by the extraction unit 101 against the specific group of serial number information about circulation-unsuitable banknotes transmitted from the server 200 to determine whether or not the banknote is a circulation-unsuitable banknote. In other words, if finding a match from the serial numbers of the circulation-unsuitable banknotes in the specific group, then the determination unit 102 may determine the banknote to be a circulation-unsuitable banknote. If finding no match from the serial numbers of the circulation-unsuitable banknotes in the specific group, then the determination unit 102 may determine the banknote not to be a circulation-unsuitable banknote.

Also, the determination unit 102 may respectively match the country information, denomination information, face/back information, serial number information, and serial number font information about the banknote extracted by the extraction unit 101 against country information, denomination information, face/back information, serial number information, and serial number font information about the circulation-unsuitable banknotes in the specific group transmitted from the server 200. If finding a circulation-unsuitable banknote with all these pieces of information matched, then the determination unit 102 may determine the banknote to be a circulation-unsuitable banknote. If finding no circulation-unsuitable banknote with all these pieces of information matched, then the determination unit 102 may determine the banknote not to be a circulation-unsuitable banknote. The information to be matched may further include feature amount information in an image.

The receiving unit 107 is connected to a communication network to receive information by wired communications or wireless communications, and may include a network interface card or the like or may be defined by a receiver or an antenna, for example. A variety of information (data) received by the receiving unit 107 is, for example, stored in the storage unit 105 under the control of the control unit 106. The transmission unit 103 and the receiving unit 107 may be, for example, integrally formed as a communication unit by a network interface card or a communication module.

The transmission unit 103 transmits information on a circulation-unsuitable banknote determined by the determination unit 102 to the server 200. The information on a circulation-unsuitable banknote transmitted to the server 200 may include: (1) information on the circulation-unsuitable banknote itself; and (2) information associated with the circulation-unsuitable banknote.

(1) Information on the circulation-unsuitable banknote itself is information acquirable from the banknote itself and may include at least one of (1-1) country information about the circulation-unsuitable banknote, (1-2) denomination information about the circulation-unsuitable banknote, (1-3) face/back information about the circulation-unsuitable banknote, or (1-4) serial number information about the circulation-unsuitable banknote, or may include all of these pieces of information. These pieces of information are acquirable by the extraction unit 101.

(2) Information associated with the circulation-unsuitable banknote is not information acquired from the banknote itself but is information relating to the banknote and may include at least one of (2-1) date and time information about detection of the circulation-unsuitable banknote by the terminal device 100 (information indicating the date and time), (2-2) location information about detection of the circulation-unsuitable banknote by the terminal device 100 (information indicating the location), or (2-3) factor information about detection of the circulation-unsuitable banknote by the terminal device 100 (information indicating the factor). The date and time information is acquirable from the RTC unit. The location information is acquirable from the location detection unit. The factor information is information indicating the reason why a banknote has been determined as a circulation-unsuitable banknote, i.e., information corresponding to the type of circulation-unsuitable banknote. Specific examples thereof include fake notes, suspect notes, and stolen banknotes.

(2) Information associated with the circulation-unsuitable banknote may also include at least one of (2-4) age information about the user of the circulation-unsuitable banknote (information indicating the age of the user) or (2-5) appearance feature information about the user of the circulation-unsuitable banknote (information indicating the appearance of the user). Examples of the appearance feature of the user include gender, height, body shape, skin color, and hair color. These pieces of information are acquirable from, for example, security camera footage of the user or information input at a POS cash register.

If the determination unit 102 has determined that a banknote is a circulation-unsuitable banknote, then the transmission unit 103 may transmit information on the circulation-unsuitable banknote to other terminal device(s) 100. This allows, for example, sharing of information on a circulation-unsuitable banknote detected by a terminal device 100 within the same group (e.g., within the same company or within the companies in the same group). Thus, a terminal device 100 belonging to the same group and not satisfying the predetermined condition due to a long distance or any other factor can also effectively detect a circulation-unsuitable banknote.

If a terminal device 100 has received a specific group of information on circulation-unsuitable banknote(s) from the server 200, then the notification unit 108 notifies the user of the terminal device 100 of reception of the information. This allows more effective detection of a circulation-unsuitable banknote from among circulated banknotes. The notification unit 108 can be, for example, the display unit, audio output unit, or vibration generator described above.

Figure 6:
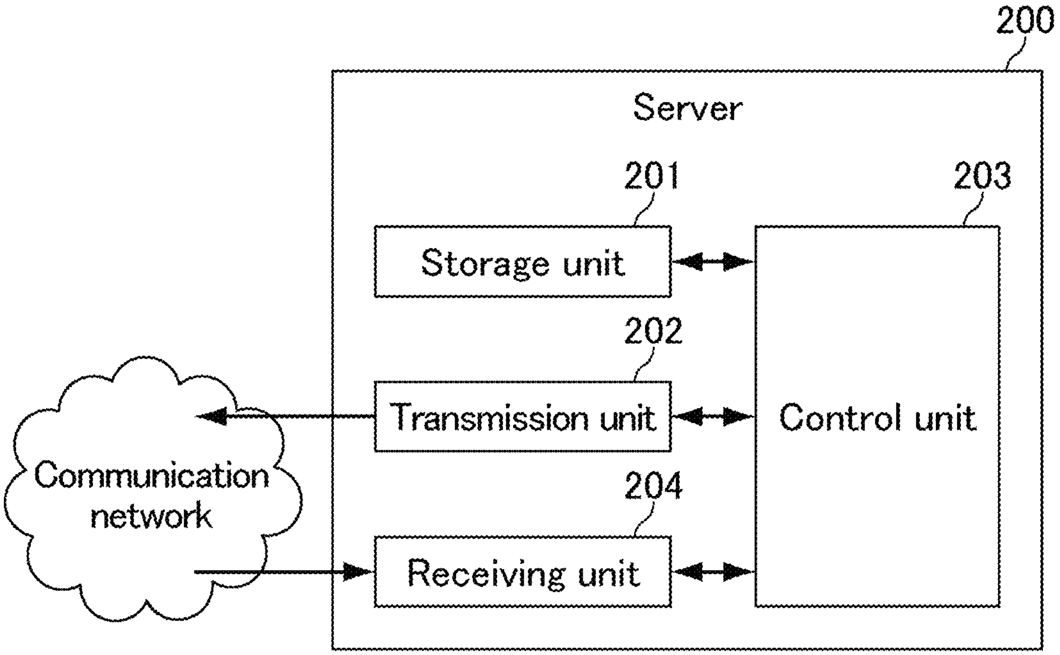
FIG. 6 is a block diagram showing the configuration of a server according to the first embodiment.

FIG. 6 is a block diagram showing the configuration of the server according to the first embodiment. The server 200 may further include a control unit (arithmetic processing unit) 203 and a receiving unit 204 in addition to the storage unit 201 and the transmission unit 202 as shown in FIG. 6.

The server 200 receives, from various parties, information on circulation-unsuitable banknotes (e.g., serial number and denomination of circulation-unsuitable banknotes, date and time, location, and factor of detection of circulation-unsuitable banknotes) as a list or sporadic information to unify and manage the pieces of information. Specifically, for example, the server 200 acquires a list of counterfeit notes from the central bank, acquires a list of bait money (banknotes withdrawn to a robber) and a list of stolen banknotes from the police, and acquires information on a suspect note and information on a banknote with a dye ink from a terminal installed at a retail store or a bank or from a mobile terminal (e.g., smartphone). The server 200 then groups the received pieces of information into groups to manage the information by group. These pieces of information may be grouped by, for example, case.

The storage unit 201 of the server 200 may store the settings for grouping which are information including rules for grouping. The server 200 (control unit 203), based on the settings for grouping, may group pieces of information on circulation-unsuitable banknotes stored in the storage unit 201 or received from various parties into a plurality of groups. The settings for grouping may be set for each user or for each area.

The server 200 may be a cloud-type server, an on-premises-type server, or a hybrid server of these two types.

The control unit 203 is a controller that controls the members of the server 200 and is defined by, for example, programs for executing various processings, a CPU that executes the programs, and various hardware devices controlled by the CPU.

The receiving unit 204 is connected to a communication network to receive information by wired communications and includes a network interface card and the like. A variety of information (data) received by the receiving unit 204 is, for example, stored in the storage unit 201 under the control of the control unit 203. The transmission unit 202 and the receiving unit 204 may be, for example, integrally formed as a communication unit by a network interface card.

If information on the circulation-unsuitable banknote X has been transmitted from the terminal device 100A having detected the circulation-unsuitable banknote X to the server 200, then the information is received by the receiving unit 204 and registered in the storage unit 201 under the control of the control unit 203.

The storage unit 201 stores the pieces of information on circulation-unsuitable banknotes grouped into a plurality of groups acquired as described above as a list (table), for example. If information on a circulation-unsuitable banknote has been transmitted from the terminal device 100A, then the server 200 (control unit 203) may update the list based on the information on the circulation-unsuitable banknote. The transmission unit 202 of the server 200, based on the updated list, may transmit a specific group of information on circulation-unsuitable banknote(s) to terminal device(s) 100B satisfying the predetermined condition.

Examples of the pieces of information on circulation-unsuitable banknotes stored in the storage unit 201 include information on a circulation-unsuitable banknote transmittable from the transmission unit 103 of each terminal device 100.

FIG. 7 is a view schematically showing a list of circulation-unsuitable banknotes stored in a storage unit in the server according to the first embodiment. A list of circulation-unsuitable banknotes stored in (managed in) the storage unit 201 may include, as shown on the left side of FIG. 7, for example, row items each indicating the serial number, denomination, group, and presence or absence of dye ink of the circulation-unsuitable banknote. Here, whether or not the banknote is a banknote with a dye ink is indicated by the presence or absence of a checkmark next to the item (checkmark added for a banknote with a dye ink, no checkmark added for a banknote with no dye ink).

In a case where there are circulation-unsuitable banknotes that are the same in serial number, denomination, group, and presence/absence of a dye ink, as shown on the right side of FIG. 7, a sub-list of these circulation-unsuitable banknotes may be stored in (managed in) the storage unit 201. The sub-list may include, for example, items indicating the serial number of the circulation-unsuitable banknote, the date, time, and location (latitude and longitude) of detection of the circulation-unsuitable banknote, and the factor of detection of the circulation-unsuitable banknote. The factor indicated here is the "counterfeit note". Each sub-list is stored in the storage unit 201 in relation to the information on the corresponding circulation-unsuitable banknote in the main list shown on the left side of FIG. 7.

The predetermined condition (coverage range) based on which whether or not a specific group of information on circulation-unsuitable banknote(s) is to be transmitted is determined may be, for example, (1) area, (2) installation store, or (3) distance, of other terminal devices 100. This allows more effective detection of a circulation-unsuitable banknote by a terminal device 100B that has received the specific group of information on circulation-unsuitable banknote(s).

In other words, in the case of the condition (1), the transmission unit 202 of the server 200 may transmit a specific group of information on circulation-unsuitable banknote(s) to terminal device(s) 100B located in an area (the same area) where the terminal device 100A has detected the circulation-unsuitable banknote. Examples of the area include regions, counties, states, provinces, cities, towns, and villages.

Alternatively, the transmission unit 202 of the server 200 may transmit a specific group of information on circulation-unsuitable banknote(s) to terminal device(s) 100B located within a predetermined range (predetermined area) regardless of the location where the terminal device 100A has detected the circulation-unsuitable banknote. Examples of the predetermined area include regions, counties, states, provinces, cities, towns, and villages.

Also, in the case of the condition (2), the transmission unit 202 of the server 200 may transmit a specific group of information on circulation-unsuitable banknote(s) to terminal device(s) 100B at store(s) having a partnership with the store where the terminal device 100A has detected the circulation-unsuitable banknote.

In the case of the condition (2), the store(s) having a partnership may be store(s) belonging to the same group (e.g., the same company or a company in the same group).

In the case of the condition (3), the transmission unit 202 of the server 200 may transmit a specific group of information on circulation-unsuitable banknote(s) to terminal device(s) 100B located within a predetermined distance from the location where the terminal device 100A has detected the circulation-unsuitable banknote.

In the case of the condition (3), whether or not terminal device(s) 100B is within a predetermined distance is determinable based on, for example, the location information acquired by the location detection units of the terminal devices 100A and 100B.

These conditions may be appropriately combined by the AND condition or the OR condition.

Examples of the timing when a specific group of information on circulation-unsuitable banknote(s) is transmitted (distributed) include (1) immediately after detection and (2) after a lapse of a predetermined period of time from the detection.

In other words, in the case of the timing (1), the transmission unit 202 of the server 200 may transmit a specific group of information on circulation-unsuitable banknote(s) every time the terminal device 100A detects a circulation-unsuitable banknote. This allows a terminal device 100B satisfying the predetermined condition to rapidly receive a specific group of information on circulation-unsuitable banknote(s), thus allowing more effective detection of a circulation-unsuitable banknote.

In the case of the timing (1), the expression "transmit . . . every time the terminal device 100A detects a circulation-unsuitable banknote" means that the processings from when the terminal device 100A has determined the banknote to be a circulation-unsuitable banknote to when the server 200 transmits a specific group of information on circulation-unsuitable banknote(s) are executed without interruption during an intentionally preset predetermined period of time. Thus, the expression possibly encompasses, for example, cases where unintentional delay of the processing occurs due to congestion in the communication network.

Also, in the case of the timing (2), the transmission unit 202 of the server 200 may transmit a specific group of information on circulation-unsuitable banknote(s) after a lapse of a predetermined period of time from when the terminal device 100A has detected a circulation-unsuitable banknote. This allows, in a case where circulation-unsuitable banknotes in the same group have been detected within a predetermined period of time, transmission of pieces of information on circulation-unsuitable banknotes in the group collectively to terminal device(s) 100B, thus reducing processing load related to distribution and update of information in the entire system. For example, pieces of information on circulation-unsuitable banknotes in the same group detected in the same city as the location (e.g., store) where a circulation-unsuitable banknote has been detected and in neighboring city(ies) within a predetermined period of time may be collectively distributed to terminal device(s) 100B.

Also, in the case of the timing (2), the beginning of the predetermined period of time may be, for example, the date and time of detection by the terminal device 100A (the date and time on which the determination unit 102 has determined a banknote to be a circulation-unsuitable banknote or the date and time on which the transmission unit 103 has transmitted information on the circulation-unsuitable banknote to the server 200) or date and time on which the server 200 (control unit 203) has stored (registered) the information on the circulation-unsuitable banknote transmitted from the terminal device 100A in the storage unit 201. The end of the predetermined period of time may be the current date and time.

In the case of the timing (2), the predetermined period of time may be set in consideration of a time difference in cases of wide areas (e.g., Europe, the United States, Russia).

Examples of the specific group of information on circulation-unsuitable banknote(s) (the contents to be distributed) from the server 200 include the information on a circulation-unsuitable banknote possibly transmitted from the transmission unit 103 of each terminal device 100 as described above.

The storage unit 201 of the server 200 may store the settings for distribution. If information on a circulation-unsuitable banknote has been transmitted from a terminal device 100, then the transmission unit 202 of the server 200 may transmit (distribute) a specific group of information on circulation-unsuitable banknote(s) to other terminal device(s) 100 based on the stored settings for distribution. In other words, if information on a circulation-unsuitable banknote has been transmitted from a terminal device 100, then the control unit 203 may execute, based on the settings for distribution, transmission processing of transmitting a specific group of information on circulation-unsuitable banknote(s) to other terminal device(s) 100 via the transmission unit 202.

The settings for distribution mean information including the timing of distribution, contents to be distributed, and the range of distribution (e.g., when and to where what is to be distributed). The settings for distribution may be set for each user, for each area, or for each model of terminal devices 100.

Figure 8:
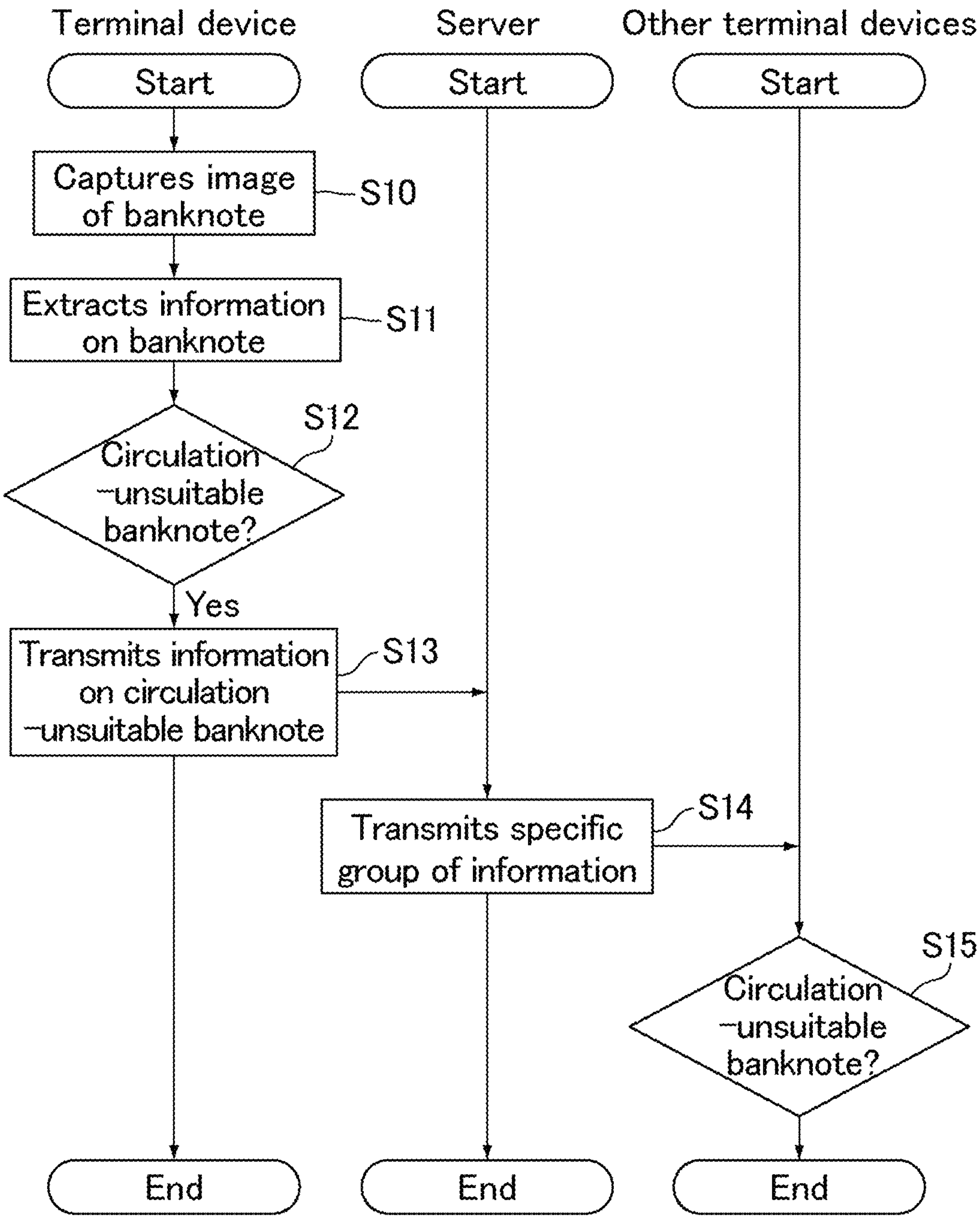
FIG. 8 is a flowchart showing another example of the operation of the banknote monitoring system according to the first embodiment.

Next, with reference to FIG. 8, the operation of the banknote monitoring system according to the present embodiment including the terminal devices and the server shown in FIGS. 5 and 6 is described. FIG. 8 is a flowchart showing another example of the operation of the banknote monitoring system according to the first embodiment.

As shown in FIG. 8, first, the image acquisition unit 104 of one terminal device 100 captures an image of a banknote (step S10).

Next, the one terminal device 100 executes the processings of steps S11 to S13 as in the case shown in FIG. 4. Meanwhile, the server 200 executes the processing of step S14 as in the case shown in FIG. 4.

Next, based on the transmitted specific group of information on circulation-unsuitable banknote(s), the determination unit 102 of other terminal device(s) 100 satisfying the predetermined condition and having received the specific group of information on circulation-unsuitable banknote(s) determines whether or not a banknote is a circulation-unsuitable banknote (step S15). This completes the operation of the system 1.

If in step S15 the banknote has been determined to be a circulation-unsuitable banknote, then the notification unit 108 of the other terminal device(s) 100 may notify the user of the determination, while if in step S15 the banknote has been determined not to be a circulation-unsuitable banknote, then the notification unit 108 of the other terminal device(s) 100 may notify the user of the determination.

If any of the other terminal devices 100 has received a specific group of information on circulation-unsuitable banknote(s) from the server 200, then the notification unit 108 of the terminal device 100 may notify the user of the terminal device 100 of reception of the information.

Second Embodiment

Figure 9:
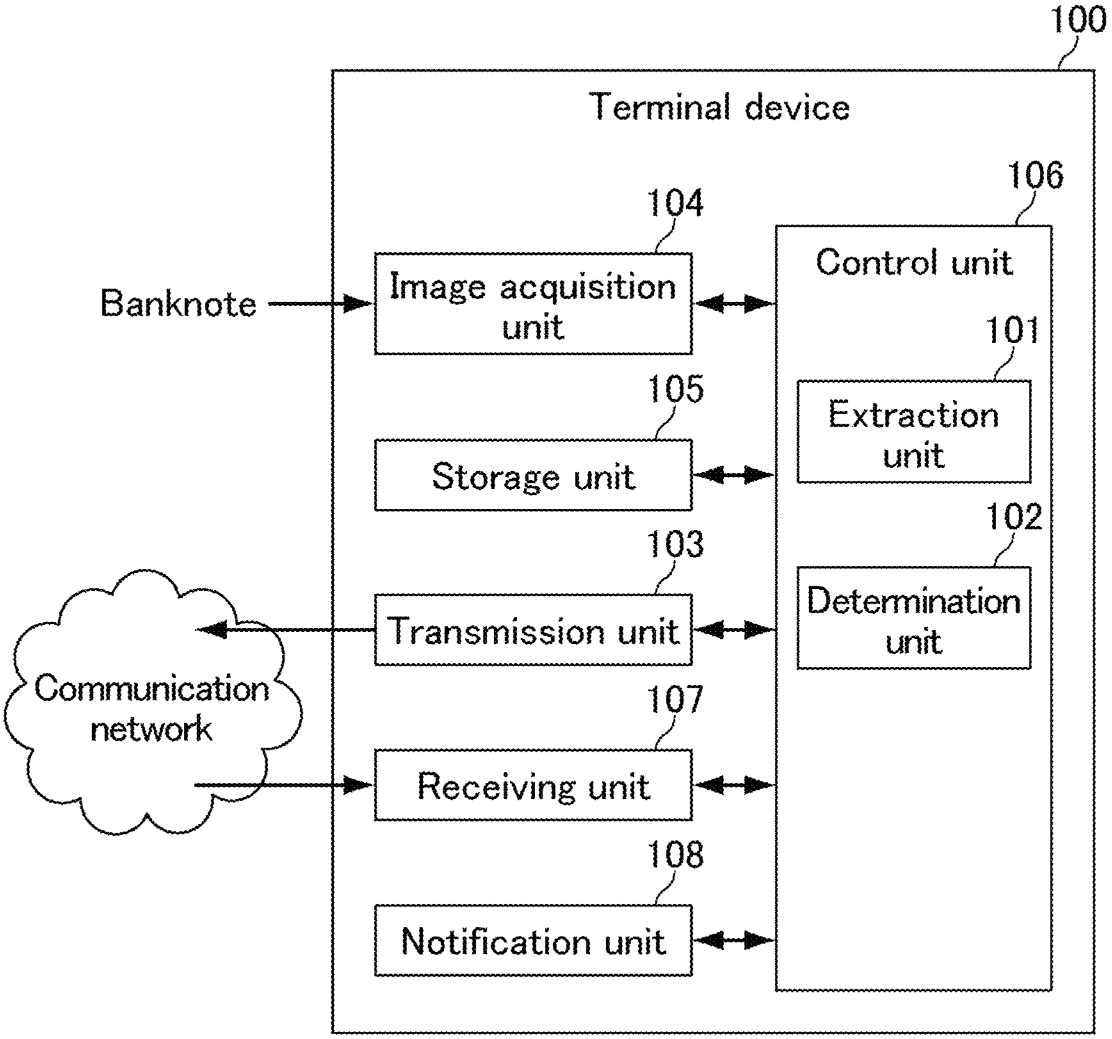
FIG. 9 is a block diagram showing the configuration of a terminal device according to a second embodiment.
Figure 10:
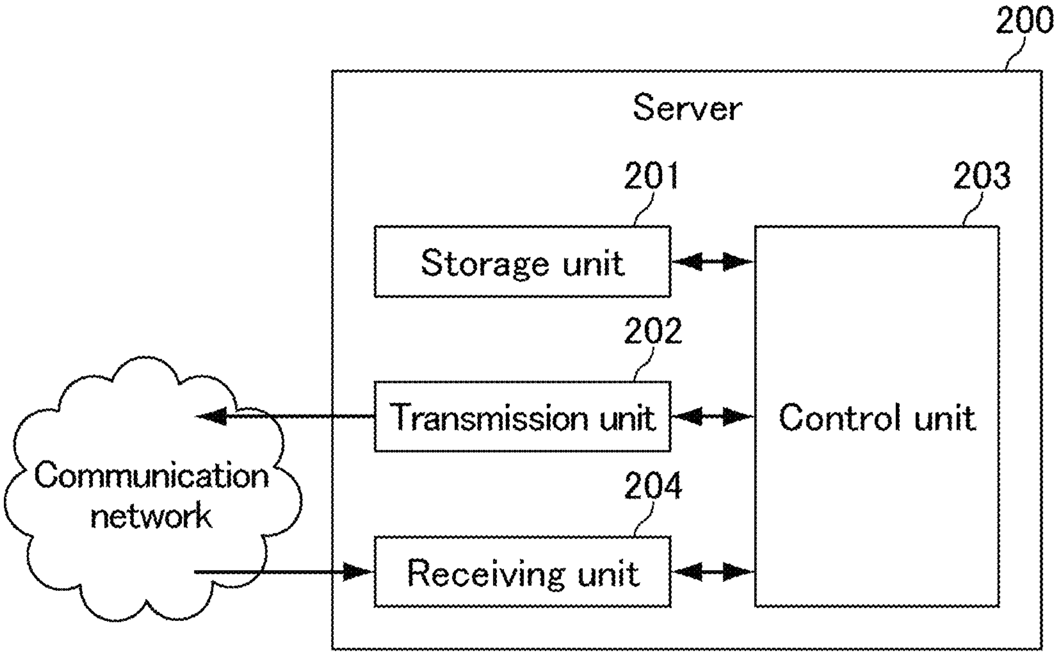
FIG. 10 is a block diagram showing the configuration of a server according to the second embodiment.

The present embodiment is substantially the same as the first embodiment, except that the concept of rankings is introduced to information on a circulation-unsuitable banknote. The rankings are updatable. The server operates based on the latest rankings. FIG. 9 is a block diagram showing the configuration of a terminal device according to the second embodiment. FIG. 10 is a block diagram showing the configuration of a server according to the second embodiment.

As shown in FIG. 9, in the present embodiment, each terminal device 100, as in the first embodiment, may further include the image acquisition unit 104, the storage unit 105, the control unit (arithmetic processing unit) 106, the receiving unit 107, and the notification unit 108, as well as the extraction unit 101, the determination unit 102, and the transmission unit 103.

As shown in FIG. 10, in the present embodiment, the server 200, as in the first embodiment, may further include the control unit (arithmetic processing unit) 203 and the receiving unit 204, as well as the storage unit 201 and the transmission unit 202.

Meanwhile, the present embodiment is different from the first embodiment in that the server 200 (control unit 203) ranks the pieces of information on circulation-unsuitable banknotes under the management. Specifically, the server 200 ranks the grouped pieces of information on circulation-unsuitable banknotes stored in the storage unit 201 by risk levels. As a result, in the storage unit 201, grouped pieces of information on circulation-unsuitable banknotes ranked by risk levels are stored. This allows selective transmission of information on a circulation-unsuitable banknote which is ranked high, i.e., with a high risk level, to other terminal device(s) 100. This allows effective reduction in risk that the user of any of the other terminal devices 100 receives a circulation-unsuitable banknote while further reducing memory consumption in the other terminal devices 100.

As described above, if information on a circulation-unsuitable banknote has been transmitted from a terminal device 100, then the transmission unit 202 of the server 200 may transmit information on circulation-unsuitable banknotes belonging to a specific group including the circulation-unsuitable banknote and being ranked higher than a predetermined rank to other terminal device(s) 100. In other words, if information on a circulation-unsuitable banknote has been transmitted from a terminal device 100, then the control unit 203 may execute transmission processing of transmitting information on circulation-unsuitable banknotes belonging to a specific group including the circulation-unsuitable banknote and being ranked higher than a predetermined rank to other terminal device(s) 100 via the transmission unit 202. The information on circulation-unsuitable banknotes ranked higher than a predetermined rank may be transmitted to the terminal device 100 having detected the circulation-unsuitable banknote as well as the other terminal device(s) 100.

The higher the risk level, the higher the information on a banknote is ranked, while the lower the risk level, the lower the information on a banknote is ranked. The transmission unit 202 of the server 200 may or may not transmit information on a circulation-unsuitable banknote in the same rank as the predetermined rank to the other terminal devices 100. This condition is appropriately settable according to the value of the predetermined rank.

The storage unit 201 of the server 200 may store settings for ranking which are information including rules for ranking, and the server 200 (control unit 203) may rank pieces of information on circulation-unsuitable banknotes (e.g., list of counterfeit notes acquired from the central bank) stored in the storage unit 201 or received from various parties by risk levels based on the settings for ranking. The settings for ranking may be set for each user or for each area.

The server 200 (control unit 203) may group pieces of information on circulation-unsuitable banknotes by case and rank the pieces of information by risk levels. In other words, the grouped pieces of information on circulation-unsuitable banknotes stored in the storage unit 201 may be grouped by case and ranked by risk levels. For example, the larger the amount of lost money and/or the number of lost banknotes in the case, the higher the server 200 (control unit 203) may rank the information. Also, the closer the location and/or date and time of the case, the higher the server 200 may rank the information. The larger the criminal organization that has caused the case (or more heinous or more vicious the case), the higher the server 200 may rank the information.

The server 200 (control unit 203) may also rank pieces of information on circulation-unsuitable banknotes by the amount and/or number of circulation-unsuitable banknotes. In other words, the grouped pieces of information on circulation-unsuitable banknotes stored in the storage unit 201 may be ranked by at least one of the amount or number of circulation-unsuitable banknotes.

Furthermore, the server 200 (control unit 203) may group the pieces of information on circulation-unsuitable banknotes by case and rank the pieces of information by at least one of the amount or number of circulation-unsuitable banknotes. In other words, the grouped pieces of information on circulation-unsuitable banknotes stored in the storage unit 201 may be grouped by case and ranked by at least one of the amount or number of circulation-unsuitable banknotes.

The server 200 (control unit 203) may, for example, rank each of the grouped pieces of information on circulation-unsuitable banknotes by ranking a group high if the corresponding case involves a large amount and/or large number of circulation-unsuitable banknotes, ranking a group middle if the corresponding case involves a moderate amount and/or moderate number of circulation-unsuitable banknotes, and ranking a group low if the corresponding case involves a small amount and/or small number of circulation-unsuitable banknotes. This is because the larger the amount and/or number of banknotes, the higher the likelihood that the banknotes are circulated and the higher the likelihood that the case is caused by a large organization.

If information on a circulation-unsuitable banknote has been transmitted from a terminal device 100, then the server 200 (control unit 203) may raise the rank of the specific group of information on circulation-unsuitable banknote(s) to which the circulation-unsuitable banknote corresponds in terms of risk levels to a higher rank. This allows effective reduction in risk that the user of a terminal device 100 receives a circulation-unsuitable banknote. For example, if a counterfeit note has been detected, then the rank of a specific group of information on circulation-unsuitable banknote(s) to which the counterfeit note corresponds is raised because the likelihood seems to be high that counterfeit notes in the specific group are thereafter used at other stores or in other areas.

If information on a suspect note has been transmitted from a mobile terminal device among terminal devices 100 and thereafter the banknote has been determined to be a counterfeit note, then the server 200 (control unit 203) may count the amount and/or number of the counterfeit note(s), rank the information on the counterfeit note(s), and raise the rank of the information according to an increase in the accumulated amount and/or number.

The server 200 (control unit 203) may lower the rank of a group of information on circulation-unsuitable banknote(s) to a lower rank as the case related to the group becomes older. For example, after one year has passed from when the first counterfeit note has been detected, the likelihood is low that such counterfeit notes are still used. Thus, the rank of the information on circulation-unsuitable banknotes in the corresponding group may be lowered by one rank.

In the present embodiment, the range (predetermined condition) of distribution, timing of distribution, and contents to be distributed, of a specific group of information on circulation-unsuitable banknote(s) are the same as in the first embodiment.

For example, the storage unit 201 of the server 200 may store settings for distribution for each user or for each area, based on which the transmission unit 202 (control unit 203) of the server 200 may transmit (distribute) a specific group of information on circulation-unsuitable banknote(s) to other terminal device(s) 100.

Also, for example, if a counterfeit note has been newly detected and the rank of a specific group of information on counterfeit notes including the counterfeit note is raised to a rank higher than the predetermined rank, then the specific group of information on counterfeit notes may be transmitted (distributed) to users in the same city as the city where the counterfeit note has been detected.

In addition, in a case where a preranked list is stored in the storage unit 201, if a circulation-unsuitable banknote the information on which is ranked higher than a predetermined rank has been detected, then the list may be transmitted (distributed) to all users in the same city as the city where the circulation-unsuitable banknote has been detected and in neighboring city(ies).

In the present embodiment, the server 200 (control unit 203) may change the range (predetermined condition) of distribution, particularly the area of distribution (transmission), of a specific group of information on circulation-unsuitable banknote(s) according to the rank. In other words, the higher the rank of the information on a circulation-unsuitable banknote, the wider the area where the transmission unit 202 of the server 200 may transmit (distribute) the information to other terminal device(s) 100.

For example, if information on a suspect note has been transmitted from a terminal device 100 and thereafter the banknote has been determined to be a counterfeit note, then the server 200 (control unit 203) may determine the area where the information is to be transmitted (distributed) according to the rank of a specific group of information on circulation-unsuitable banknote(s) to which the counterfeit note corresponds. Specifically, for example, information may be transmitted to a wide range (wide area, e.g., all over the country) if ranked high, may be transmitted to a middle range (moderate area, i.e., regions, counties) if ranked middle, and may be transmitted to a narrow range (narrow area, i.e., states, provinces, cities, towns, villages) if ranked low.

Figure 11:
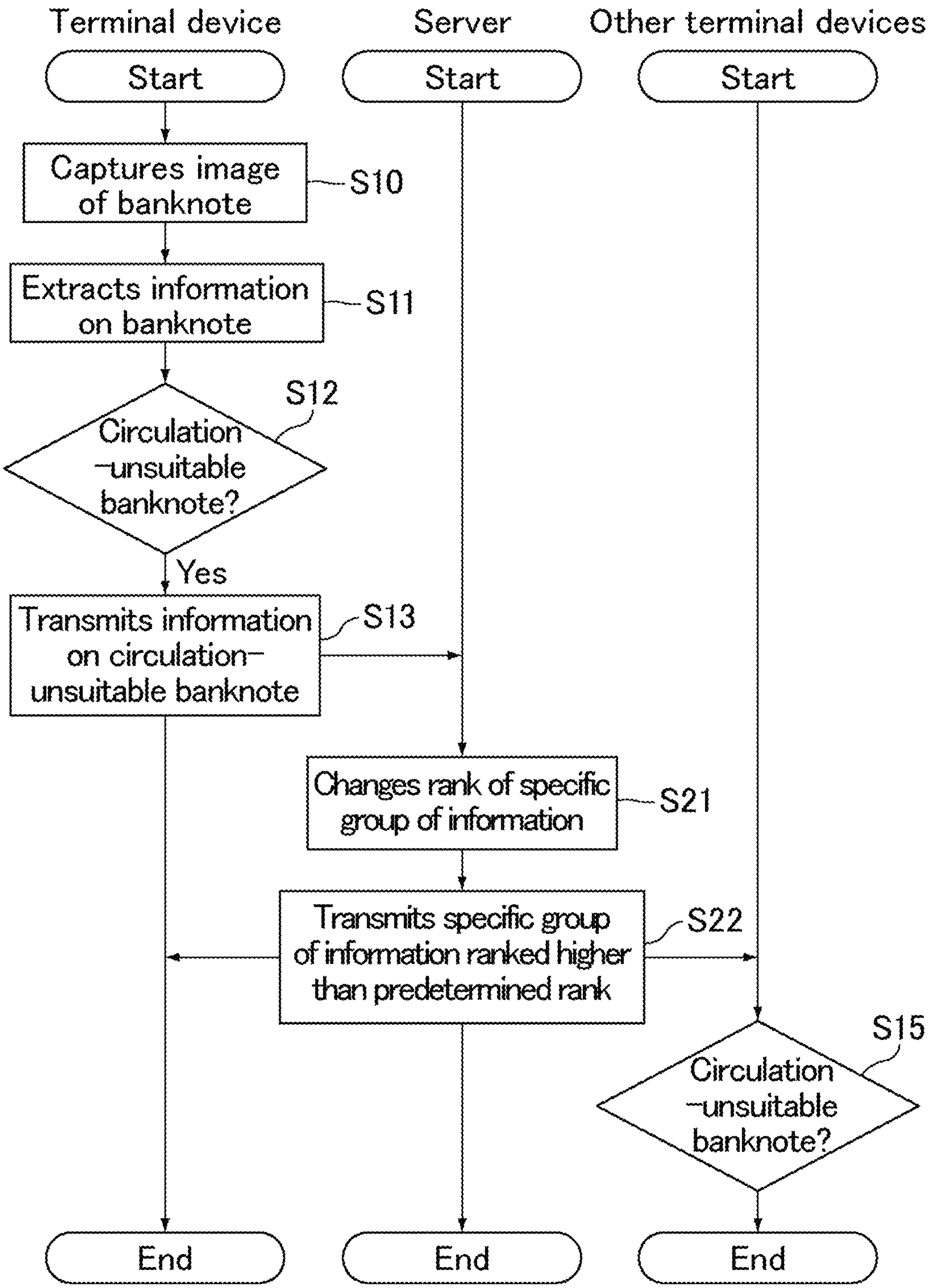
FIG. 11 is a flowchart showing an example of the operation of a banknote monitoring system according to the second embodiment.

Next, with reference to FIG. 11, the operation of the banknote monitoring system according to the present embodiment is described. FIG. 11 is a flowchart showing an example of the operation of the banknote monitoring system according to the second embodiment.

As shown in FIG. 11, first, a terminal device 100 executes the processings of steps S10 to S13 as in the first embodiment.

Next, the server 200 (control unit 203) raises the rank of the specific group of information on circulation-unsuitable banknote(s) to which the circulation-unsuitable banknote, whose information has been transmitted from the terminal device 100, corresponds in terms of risk levels to a higher rank (step S21).

Next, the transmission unit 202 of the server 200 transmits information on circulation-unsuitable banknotes belonging to the specific group and being ranked higher than a predetermined rank to the terminal device 100 having detected the circulation-unsuitable banknote and other terminal device(s) 100 (step S22).

Thereafter, as in the case shown in FIG. 8, each mobile terminal device 100 executes the processing of step S15. This completes the operation of the system according to the present embodiment.

If in step S15 the banknote has been determined to be a circulation-unsuitable banknote, then the notification unit 108 of the terminal device 100 may notify the user of the determination, while if in step S15 the banknote has been determined not to be a circulation-unsuitable banknote, then the notification unit 108 of the terminal device 100 may notify the user of the determination.

If any of the other terminal devices 100 has received a specific group of information on circulation-unsuitable banknote(s) from the server 200, then the notification unit 108 of the terminal device 100 may notify the user of the terminal device 100 of reception of the information.

Third Embodiment

Figure 12:
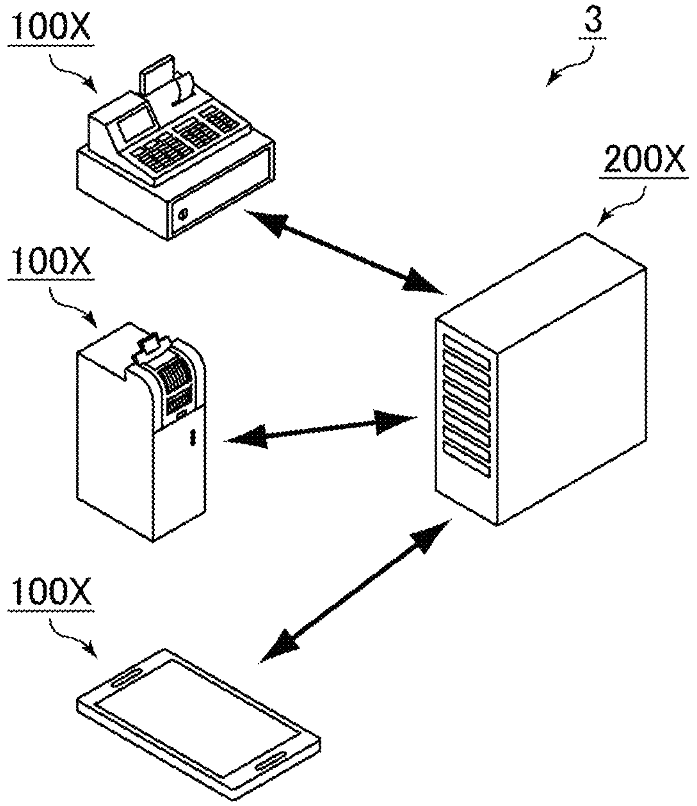
FIG. 12 is a schematic view showing the configuration of a banknote monitoring system according to a third embodiment.

FIG. 12 is a schematic view showing the configuration of a banknote monitoring system according to a third embodiment. A banknote monitoring system 3 according to the present embodiment is a system for receiving, registering, managing, distributing, and determining information on circulation-unsuitable banknotes, and corresponds to a more specific embodiment than the first and second embodiments. The banknote monitoring system 3, as shown in FIG. 12, includes terminal devices 100X, and a server 200X that transmits information to and receives information from the individual terminal devices 100X via communication networks.

Each terminal device 100X is a stationary terminal device or a mobile terminal device. Examples of the stationary terminal device include cash register change dispensers, automatic teller machines (ATMs), money changers, teller machines, teller cashiers, banknote counters, banknote organizers, automatic settlement machines, KIOSKs, vending machines, ticket vending machines, and other banknote handing devices. Examples of the mobile terminal devices include mobile terminals (e.g., laptops computers, tablet computers, smartphones, and mobile phones) and wearable terminals (e.g., smartwatches, smartglasses) which have a camera, external communication, display, location information, and other functions.

The server 200X may be a cloud-type server or an on-premises-type server, for example.

Figure 13:
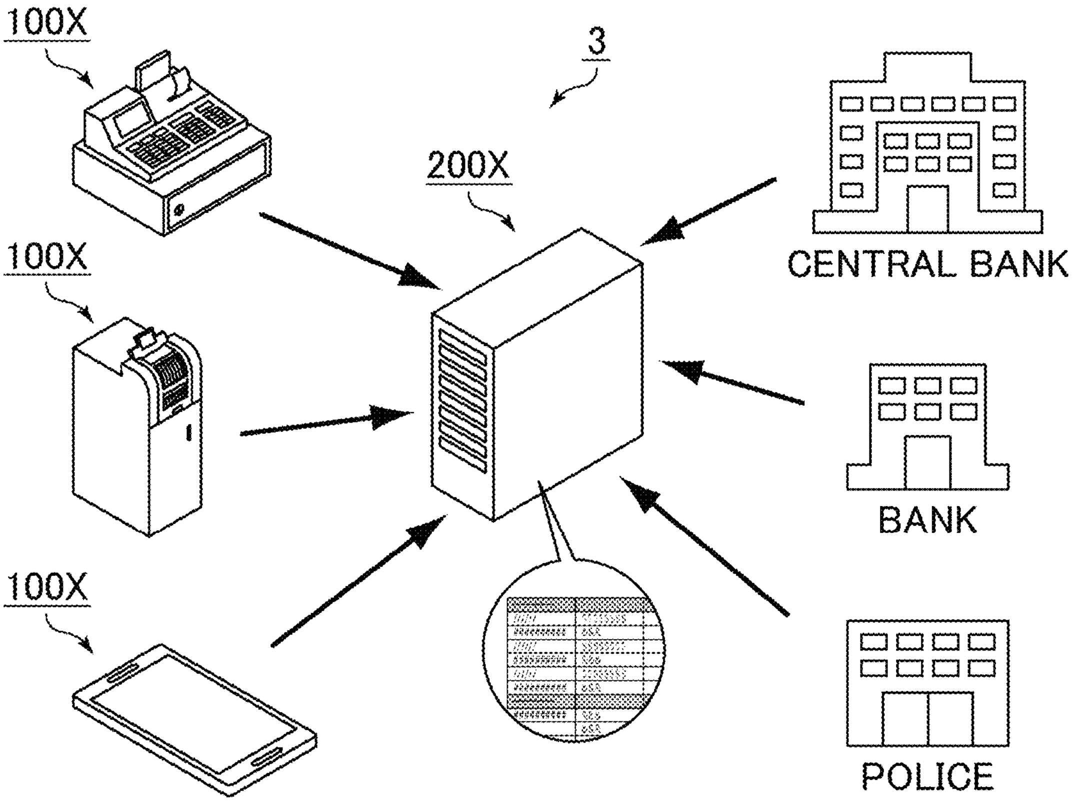
FIG. 13 is a schematic view showing the configuration of the banknote monitoring system according to the third embodiment in a case of receiving information on circulation-unsuitable banknotes.

FIG. 13 is a schematic view showing the configuration of the banknote monitoring system according to the third embodiment in a case of receiving information on circulation-unsuitable banknotes. As shown in FIG. 13, the system receives information on circulation-unsuitable banknotes from various parties (e.g., terminal devices 100X, the central bank, bank, police) and registers it in the server 200X. In this process, pieces of information on circulation-unsuitable banknotes related to one another are registered in a group in the server 200X, and the pieces of information are updated. For example, in a case where banknotes managed by serial numbers are stolen, the pieces of information on the circulation-unsuitable banknotes are registered in the same group. Also, for example, pieces of information on circulation-unsuitable banknotes having the same serial number or pieces of information on circulation-unsuitable banknotes having different serial numbers but similar features are registered in the same group. Such circulation-unsuitable banknotes in the same group of information may be those issued in the same period or in different periods.

The information on a circulation-unsuitable banknote is weighed by detailed item of damage from the case such as the amount of banknotes, number of banknotes, factor, area, and date and time, so that each circulation-unsuitable banknote and each group of circulation-unsuitable banknotes are ranked by risk levels (which may be importance levels or urgency levels).

Figure 14:
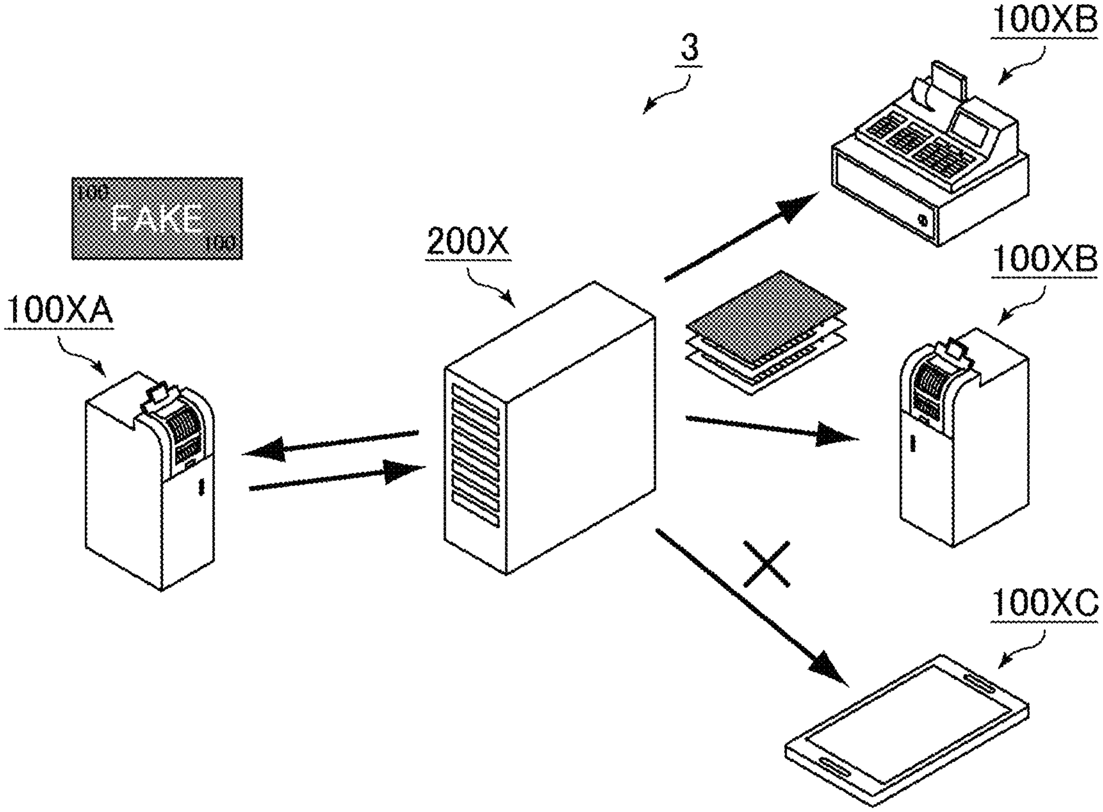
FIG. 14 is a schematic view showing the configuration of the banknote monitoring system according to the third embodiment in a case of distributing information on a circulation-unsuitable banknote.

FIG. 14 is a schematic view showing the configuration of the banknote monitoring system according to the third embodiment in a case of distributing information on a circulation-unsuitable banknote. As shown in FIG. 14, if a terminal device 100XA has newly found, for example, one circulation-unsuitable banknote, then the server 200X raises the rank of the group of information including the information on the circulation-unsuitable banknote, and distributes serial number information and other information about all circulation-unsuitable banknotes in the group to other terminal devices 100XB satisfying the predetermined condition and not to another terminal device 100XC not satisfying the predetermined condition. The terminal devices 100XB store the distributed information into the storage unit and, based on the stored information, monitor the serial numbers of the banknotes being handled to detect and exclude circulation-unsuitable banknotes. This allows prediction and prevention of use of circulation-unsuitable banknotes belonging to the same group by the same criminal person or the same criminal organization. The group of information on circulation-unsuitable banknote(s) of which the rank has been changed is distributed also to the terminal device 100XA.

The terminal devices 100XB may use the distributed information as is or may use the distributed information after ranking the information with a consideration given to the conditions set therein. Also, the terminal devices 100XB may store all the distributed information in the storage unit, or may store some pieces of information in descending order of rank.

In cases where monitoring of the serial numbers of banknotes is allowed to take time or where the processing time, memory, or other hardware specifications of a terminal device 100 are restricted, all or some of the information on circulation-unsuitable banknotes to be distributed may be stored in the server 200X or a different server (e.g., cloud server), so that the monitoring of the serial numbers of banknotes is executable with reference to the stored information as needed.

As described above, the present embodiment allows authentication using the latest information and advanced security detection, not by the current visual check or using a simple authenticity checker (i.e., UV lamp), at small retail stores and other stores not having introduced an advanced machine due to the price, size, operation, and/or other restrictions. This can reduce the risk that the user of a terminal device 100 receives a circulation-unsuitable banknote.

The present embodiment also can reduce the risk that general consumers or travelers receive a circulation-unsuitable banknote as their change.

Fourth Embodiment

Figure 15:
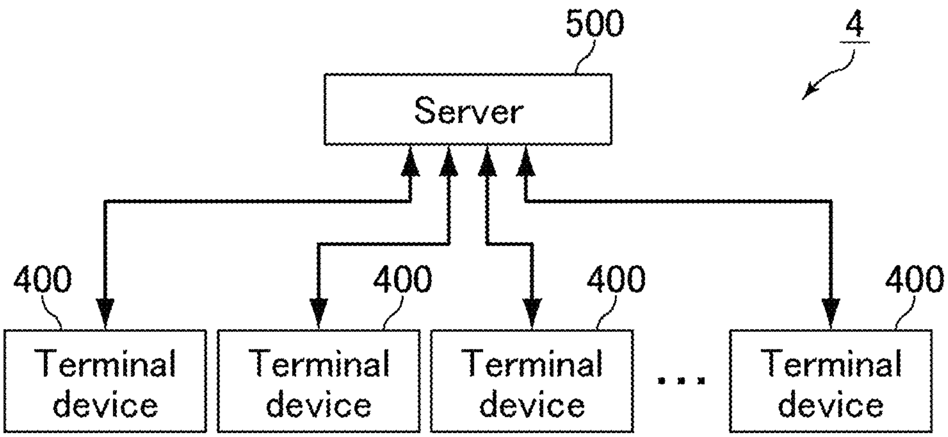
FIG. 15 is a block diagram showing the configuration of a banknote monitoring system according to a fourth embodiment.

FIG. 15 is a block diagram showing the configuration of a banknote monitoring system according to a fourth embodiment. A banknote monitoring system 4 according to the present embodiment is a system for detecting circulation-unsuitable banknotes, and includes, as shown in FIG. 15, terminal devices 400 and a server 500 that transmits information to and receives information from the terminal devices 400. Each of the terminal devices 400 and the server 500 are communicatively connected to each other over a communication network such as a local area network (LAN), a wide area network (WAN), or the Internet.

Figure 16:
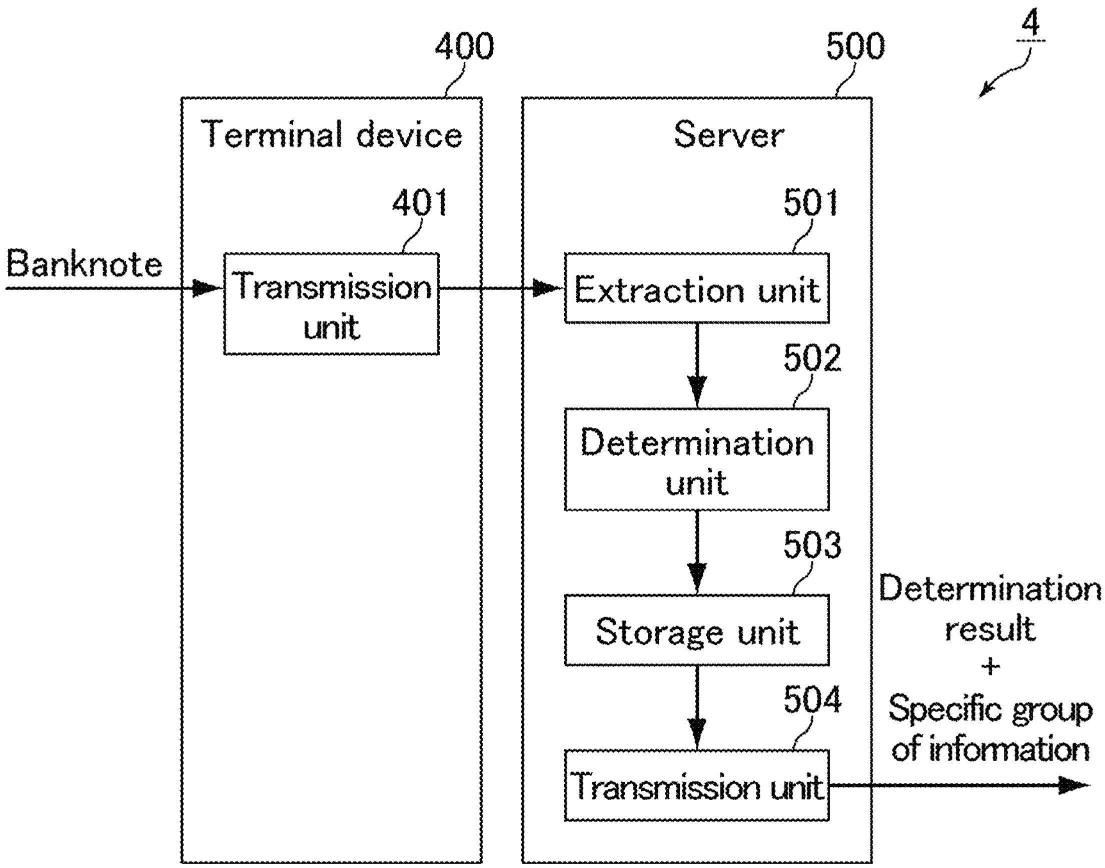
FIG. 16 is another block diagram showing the configuration of the banknote monitoring system according to the fourth embodiment.

FIG. 16 is another block diagram showing the configuration of the banknote monitoring system according to the fourth embodiment. Each of the terminal devices 400 includes, as shown in FIG. 16, a transmission unit (transmitter) 401.

The transmission unit 401 transmits image data of a banknote to the server 500. The transmission unit 401 is connected to a communication network to transmit information by wired communications or wireless communications, and may include a network interface card and the like or may be defined by a transmitter or an antenna, for example. A variety of information (data) including image data is output to the transmission unit 401 by the later-described control unit 404 and then transmitted by the transmission unit 401. The control unit 404 executes the processing of determining and deciding the timing, the contents, the range (destinations), and other conditions of transmission which is to be executed by the transmission unit 401.

The server 500 is configured such that, if image data of a banknote has been transmitted from a terminal device 400, then the server 500 determines whether or not the banknote is a circulation-unsuitable banknote and, if the banknote has been determined to be a circulation-unsuitable banknote, then the server 500 transmits a specific group of information on circulation-unsuitable banknote(s) to which the circulation-unsuitable banknote corresponds to other terminal device(s) 400 satisfying the predetermined condition. The server 500 includes, as shown in FIG. 16, an extraction unit 501, a determination unit 502, a storage unit (memory) 503, and a transmission unit (transmitter) 504.

The extraction unit 501 extracts information on the banknote from the image data transmitted from any of the terminal devices 400. Specifically, for example, the extraction unit 501 recognizes the country, denomination, face/back, and serial number of the banknote based on image data of the banknote, and thus acquires information indicating these results.

The determination unit 502 is configured to determine whether or not a banknote is a circulation-unsuitable banknote based on the information on the banknote extracted by the extraction unit 501. This allows detection of a circulation-unsuitable banknote from among circulated banknotes. The determination unit 502 determines whether or not a banknote is a circulation-unsuitable banknote based on, for example, the country information, denomination information, face/back information, and serial number information about the banknote extracted by the extraction unit 501.

The storage unit 503 is a database that stores pieces of information on circulation-unsuitable banknotes grouped into a plurality of groups. The pieces of information may be grouped by case, for example. In other words, the server 500 may manage pieces of information on circulation-unsuitable banknotes in the storage unit 503 by grouping the pieces of information by case.

The storage unit 503 is defined by, for example, RAM, ROM, flash memory, HDD, SSD, and/or other storage or memory devices. The storage unit 503 allows reading and writing of data and programs.

Figure 17:
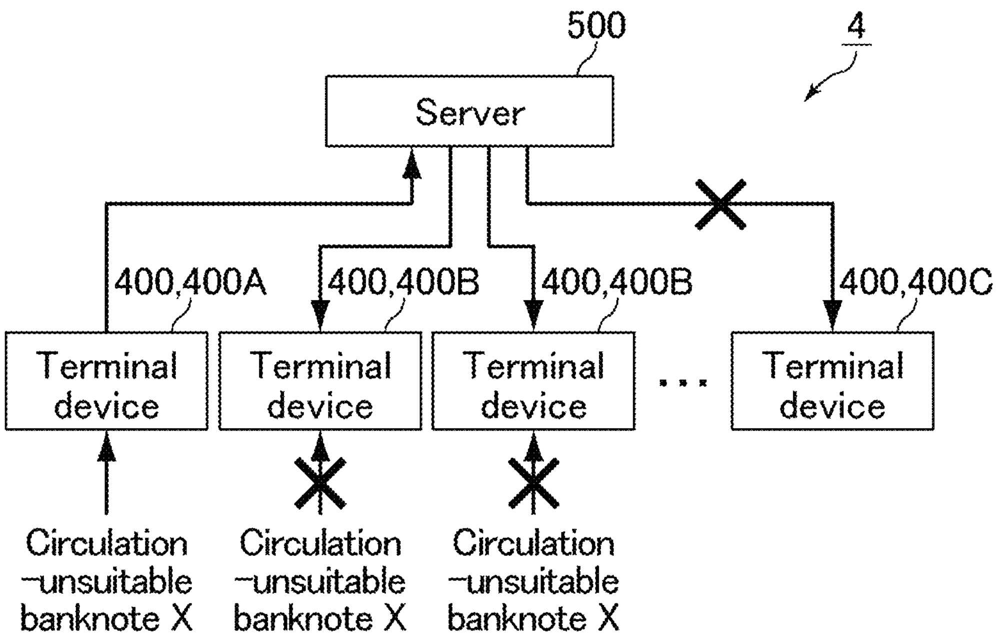
FIG. 17 is a block diagram showing the operation of the banknote monitoring system according to the fourth embodiment.

FIG. 17 is a block diagram showing the operation of the banknote monitoring system according to the fourth embodiment. As shown in FIG. 17, if the determination unit 502 (not shown in FIG. 17) of the server 500 has determined the banknote to be a circulation-unsuitable banknote X based on the image data of the banknote transmitted from the terminal device 400A, then the transmission unit 504 (not shown in FIG. 17) of the server 500 transmits a specific group of information (e.g., serial number information) on circulation-unsuitable banknotes including the circulation-unsuitable banknote X to other terminal devices 400 satisfying a predetermined condition (terminal devices 400B in FIG. 17). Since the server 500 can transmit the information on the circulation-unsuitable banknote X and the information on circulation-unsuitable banknotes in the same group as the circulation-unsuitable banknote X to the terminal devices 400B, the terminal devices 400B can correctly (with high accuracy) detect the circulation-unsuitable banknote X and any circulation-unsuitable banknotes related to the circulation-unsuitable banknote X, e.g., circulation-unsuitable banknotes with the same serial number.

Also, the transmission unit 504 transmits the determination result by the determination unit 502, i.e., information indicating whether or not the banknote is a circulation-unsuitable banknote, to the terminal device 400A.

The transmission unit 504 is connected to a communication network to transmit information by wired communications, and includes a network interface card and the like. A variety of information (data) including a specific group of information on circulation-unsuitable banknote(s) is output to the transmission unit 504 by the later-described control unit 505 and then transmitted by the transmission unit 504. The control unit 505 executes the processing of determining and deciding the timing, the contents (e.g., contents of the specific group of information on circulation-unsuitable banknote(s)), the range (destinations, e.g., mobile terminal devices 400B satisfying the predetermined condition), and other conditions of transmission which is to be executed by the transmission unit 504. For example, if the determination unit 502 has determined the banknote to be a circulation-unsuitable banknote X, then the control unit 505 executes transmission processing of transmitting a specific group of information on circulation-unsuitable banknote(s) to which the circulation-unsuitable banknote X corresponds to the terminal devices 400B satisfying the predetermined condition via the transmission unit 504.

Figure 18:
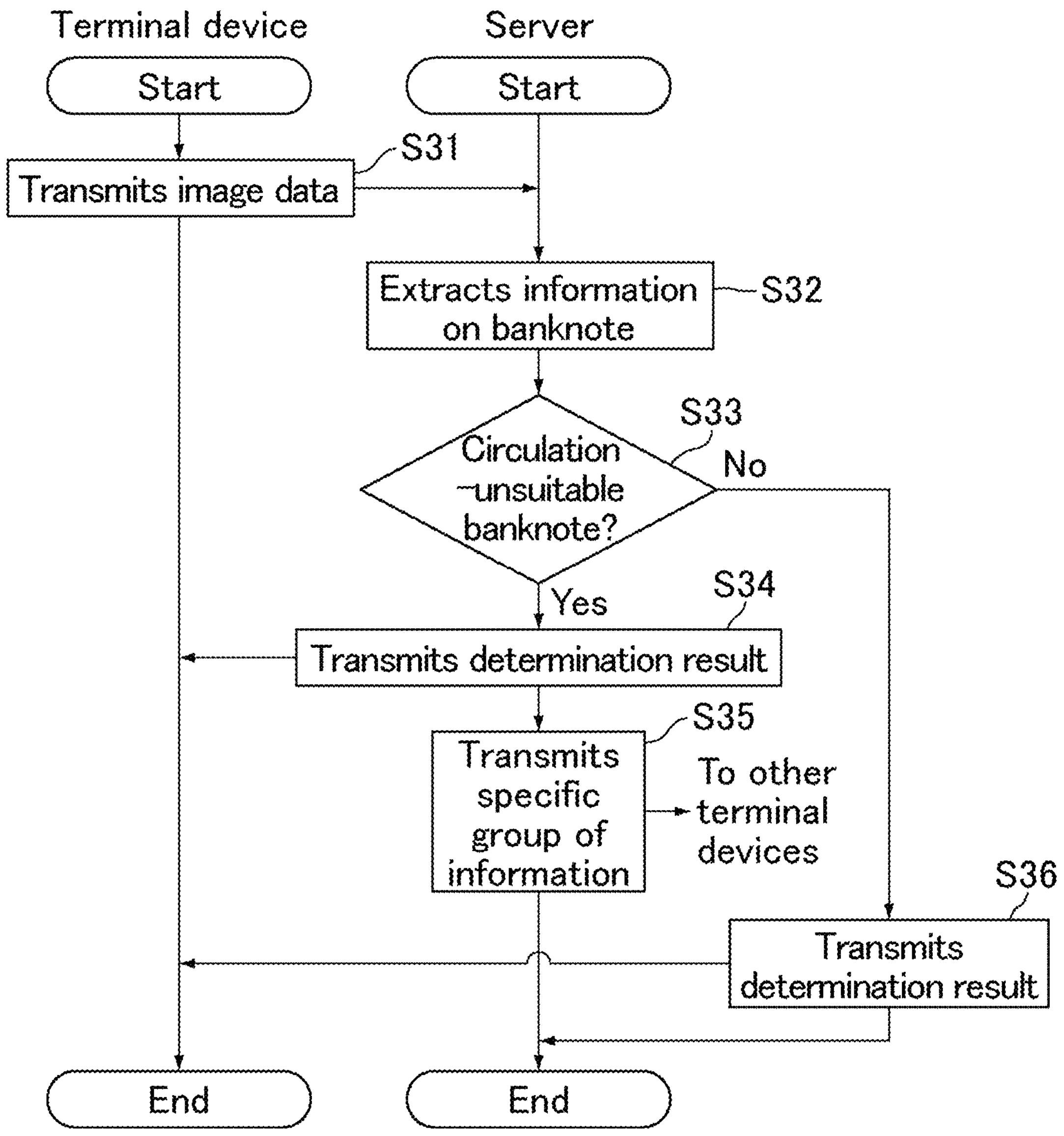
FIG. 18 is a flowchart showing an example of the operation of the banknote monitoring system according to the fourth embodiment.

Next, the operation of the banknote monitoring system according to the present embodiment is described with reference to FIG. 18. FIG. 18 is a flowchart showing an example of the operation of the banknote monitoring system according to the fourth embodiment.

As shown in FIG. 18, first, the transmission unit 401 of a terminal device 400 transmits image data of a banknote to the server 500 (step S31).

If the image data is transmitted to the server 500, then the extraction unit 501 of the server 500 extracts information on the banknote from the transmitted image data (step S32).

Next, the determination unit 502 of the server 500 determines whether or not the banknote is a circulation-unsuitable banknote based on the information on the banknote extracted by the extraction unit 501 (step S33).

If the banknote has been determined to be a circulation-unsuitable banknote (step S33: Yes), then the transmission unit 504 of the server 500 transmits the determination result to the terminal device 400 having transmitted the image data (step S34), and the transmission unit 504 of the server 500 transmits a specific group of information on circulation-unsuitable banknote(s) to which the circulation-unsuitable banknote corresponds to other terminal device(s) 400 satisfying the predetermined condition (step S35). This completes the operation of the system 4.

If in step S33 the banknote has been determined not to be a circulation-unsuitable banknote (step S33: No), then the transmission unit 504 of the server 500 transmits the determination result to the terminal device 400 having transmitted the image data (step S36). This completes the operation of the system 4.

In the present embodiment, not each terminal device 400 but the determination unit 502 of the server 500 determines whether or not a banknote is a circulation-unsuitable banknote. This allows more accurate detection of a circulation-unsuitable banknote from among circulated banknotes than in cases where the determination process is executed by each terminal device 400 while the processing load on each terminal device 400 is reduced. This is because the server 500 can execute more advanced (more accurate) determination processing. For example, a circulation-unsuitable banknote can be detected by storing a large amount of information on circulation-unsuitable banknotes in the storage unit 503 of the server 500 and matching the information on the banknote against the stored information.

Also, since a specific group of information on circulation-unsuitable banknote(s) to which a circulation-unsuitable banknote X detected by a terminal device 400A (e.g., mobile terminal) corresponds to terminal device(s) 400B satisfying a predetermined condition, information on the circulation-unsuitable banknote X and information on circulation-unsuitable banknotes related to the banknote X, i.e., information (e.g., denomination information, serial number information, factor information) on circulation-unsuitable banknotes with a high risk level and high priority, can be transmitted only to terminal device(s) 400 with a high risk level and high priority. For example, information (e.g., denomination information, serial number information, factor information) on circulation-unsuitable banknotes used by the same criminal person or criminal organization as the user of the circulation-unsuitable banknote X can be transmitted to terminal device(s) 400B located at a short distance from the terminal device 400A that has detected the circulation-unsuitable banknote X. This allows the user of a terminal device 400B to visually simply check the country, denomination, and serial number of a banknote, and thus can simply and effectively reduce the risk that the user receives the circulation-unsuitable banknote X and a circulation-unsuitable banknote related to the circulation-unsuitable banknote X (e.g., circulation-unsuitable banknote with the same serial number).

Meanwhile, the specific group of information on circulation-unsuitable banknote(s) is not transmitted to other terminal device(s) 400 (e.g., terminal device 400C in FIG. 17) not satisfying the predetermined condition. This can prevent excessive memory consumption in a terminal device 400 with a low risk level and low priority. Also, information on circulation-unsuitable banknotes in groups not including the circulation-unsuitable banknote X detected by the terminal device 400A (e.g., mobile terminal) is not transmitted to terminal devices 400B and 400C. From this viewpoint, too, the above configuration can reduce memory consumption in the terminal devices 400B and 400C. Thus, load on the entire system can be reduced.

As described above, the banknote monitoring system 4 of the present embodiment can simply and efficiently detect a circulation-unsuitable banknote while reducing the system load.

Next, more specific modes of the terminal devices 400 and the server 500 according to the present embodiment are described.

Each terminal device 400 may be a stationary terminal device or a mobile terminal device.

Examples of the stationary terminal device include cash register change dispensers, automatic teller machines (ATMs), money changers, teller machines, teller cashiers, banknote counters, banknote organizers, automatic settlement machines, KIOSKs, vending machines, ticket vending machines, and other banknote handing devices. Teller machines execute a variety of processing including deposit processing and withdrawal processing, and are typically installed at branches of banks or other financial institutions. Teller cashiers execute deposit processing and withdrawal processing at teller windows in branches and are typically installed at teller windows in branches of financial institutions and communicatively connected to teller machines.

Examples of the mobile terminal devices include mobile terminals (e.g., laptops computers, tablet computers, smartphones, and mobile phones) and wearable terminals (e.g., smartwatches, smartglasses) which have a camera, external communication, display, location information, and other functions.

Figure 19:
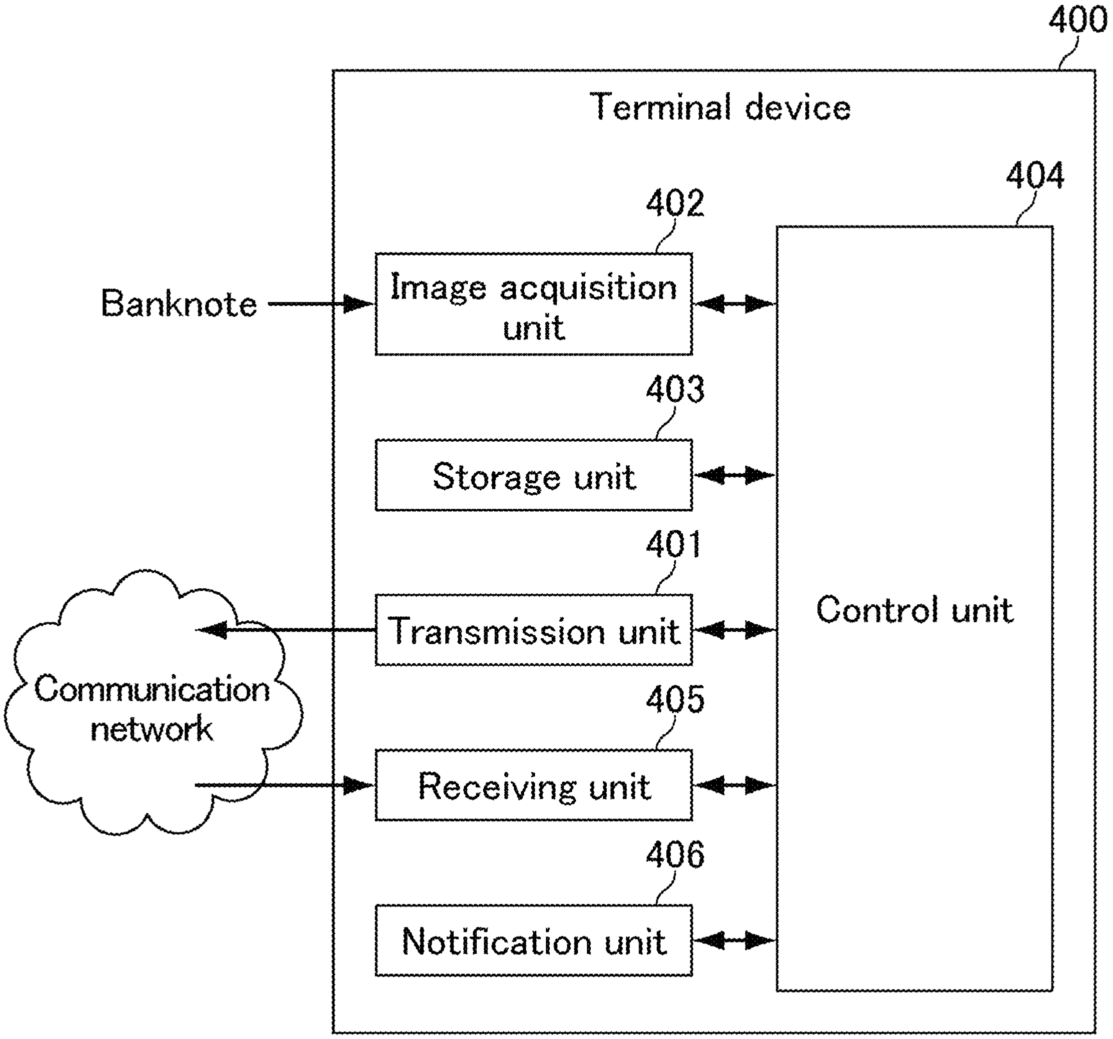
FIG. 19 is a block diagram showing the configuration of a terminal device according to the fourth embodiment.

FIG. 19 is a block diagram showing the configuration of a terminal device according to the fourth embodiment. Each terminal device 400 may further include an image acquisition unit 402, a storage unit 403, a control unit (arithmetic processing unit) 404, a receiving unit 405, and a notification unit 406 as shown in FIG. 19 as well as the transmission unit 401 described above.

Also, each terminal device 400 may include a magnetic detection unit (e.g., magnetic line sensor) that acquires magnetic data (magnetism) of a banknote, a thickness detection unit (e.g., thickness detecting line sensor) that acquires thickness data (thickness features) of a banknote, a fluorescence detection unit (e.g., a light source that emits excitation light and an optical sensor that receives fluorescence) that acquires fluorescence data (fluorescence features) of a banknote by emitting excitation light such as ultraviolet rays, and a phosphorescence detection unit (e.g., a light source that emits excitation light and an optical sensor that receives phosphorescence) that acquires phosphorescence data (phosphorescence features) of a banknote by emitting excitation light such as ultraviolet rays.

Each terminal device 400 may include a location detection unit that detects the location (e.g., latitude and longitude) of the terminal device 400. The location detection unit detects the location using a GNSS and is defined by, for example, a GPS sensor (GPS module).

Each terminal device 400 may also include a real-time clock (RTC) unit that outputs a clock signal indicating the measured time. The RTC unit keeps measuring the passage of time by power supply from a source of power or from an auxiliary source of power (e.g., primary battery) while the terminal device 400 is turned off. The RTC unit includes a crystal oscillator or another oscillator.

Each terminal device 400 may also include an LCD panel, an organic EL panel, or another display unit; a touchscreen, an input button, or another input unit; a printer or another output unit; a speaker or another audio output unit; a microphone or another audio input unit; and a vibration motor or another a vibration generator.

The image acquisition unit 402 captures an image of a banknote. Specifically, the image acquisition unit 402 generates image data of a banknote. A still image and/or a moving image of the banknote can be generated from the generated image data. An image acquired by the image acquisition unit 402 may be a visible image based on visible light or an invisible image based on infrared light or other invisible light. The image acquisition unit 402 can be, for example, an optical line sensor or a camera module. The image acquisition unit 402 may include, as the light source, light sources that can emit visible light, infrared light, and other types of lights (lights with different wavelengths).

The storage unit 403 may be defined by, for example, RAM, ROM, flash memory, SSD, and/or other storage or memory devices. The storage unit 403 allows reading and writing of data and programs.

The control unit 404 is a controller that controls members of the terminal device 400 and is defined by, for example, programs for executing various processings, a CPU that executes the programs, and various hardware devices controlled by the CPU.

The receiving unit 405 is connected to a communication network to receive information by wired communications or wireless communications, and may include a network interface card or the like or may be defined by a receiver or an antenna, for example. A variety of information (data) received by the receiving unit 405 is, for example, stored in the storage unit 403 under the control of the control unit 404. The transmission unit 401 and the receiving unit 405 may be, for example, integrally formed as a communication unit by a network interface card or a communication module.

If a terminal device 400 has received a specific group of information on circulation-unsuitable banknote(s) from the server 500, then the notification unit 406 notifies the user of the terminal device 400 of reception of the information. This allows the user to visually simply check the denomination and serial number of a banknote to detect a circulation-unsuitable banknote from among circulated banknotes. If receiving a determination result from the server 500, then the notification unit 406 notifies the user of the terminal device 400 of the result. The notification unit 406 can be, for example, the display unit, audio output unit, or vibration generator described above.

If the determination unit 502 of the server 500 has determined that a banknote is a circulation-unsuitable banknote, then the transmission unit 401 may transmit information on the circulation-unsuitable banknote to other terminal device(s) 400. This allows, for example, sharing of information on a circulation-unsuitable banknote detected by a terminal device 400 within the same group (e.g., within the same company or within the companies in the same group). Thus, a terminal device 400 belonging to the same group and not satisfying the predetermined condition due to a long distance or any other factor can also effectively detect a circulation-unsuitable banknote.

The transmission unit 401 may transmit data acquired from a banknote using a magnetic detection unit, a thickness detection unit, a fluorescence detection unit, or a phosphorescence detection unit, for example, to the server 500.

Figure 20:
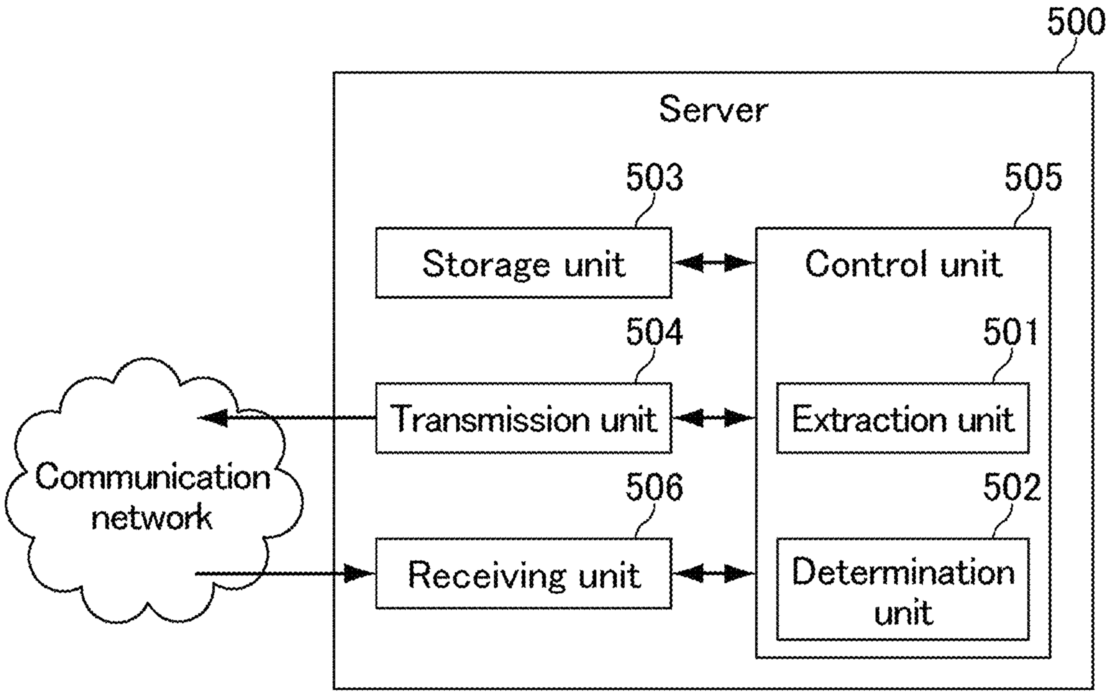
FIG. 20 is a block diagram showing the configuration of a server according to the fourth embodiment.

FIG. 20 is a block diagram showing the configuration of the server according to the fourth embodiment. The server 500 may further include a control unit (arithmetic processing unit) 505 and a receiving unit 506 as shown in FIG. 20 in addition to the extraction unit 501, the determination unit 502, the storage unit 503, and the transmission unit 504 described above.

The server 500 receives, from various parties, information on circulation-unsuitable banknotes (e.g., serial number and denomination of circulation-unsuitable banknotes, date and time, location, and factor of detection of circulation-unsuitable banknote) as a list or sporadic information to unify and manage the pieces of information. Specifically, for example, the server 500 acquires a list of counterfeit notes from the central bank, acquires a list of bait money (banknotes withdrawn to a robber) and a list of stolen banknotes from the police, and acquires information on a suspect note and information on a banknote with a dye ink from a terminal installed at a retail store or a bank or from a mobile terminal (e.g., smartphone). The server 500 then groups the received pieces of information into groups to manage the information by group. These pieces of information may be grouped by, for example, case.

The storage unit 503 of the server 500 may store the settings for grouping which are information including rules for grouping. The server 500 (control unit 505), based on the settings for grouping, may group pieces of information on circulation-unsuitable banknotes stored in the storage unit 503 or received from various parties into a plurality of groups. The settings for grouping may be set for each user or for each area.

The server 500 may be a cloud-type server, an on-premises-type server, or a hybrid server of these two types.

The control unit 505 is a controller that controls the members of the server 500 and is defined by, for example, programs for executing various processings, a CPU that executes the programs, and various hardware devices controlled by the CPU.

The control unit 505 can function as the extraction unit 501 and the determination unit 502 by executing the corresponding programs.

Based on the image data of the banknote generated by the image acquisition unit 402, the extraction unit 501 may extract (acquire) information on the banknote.

The information on the banknote extracted by the extraction unit 501 may include at least one of country (which may be an area) information, denomination information, face/back information, feature amount information included in image data, serial number information, or serial number font information, each of these pieces of information being about the banknote.

Examples of the feature amount information included in image data of the banknote extracted by the extraction unit 501 include information on the feature amount of a visible image and/or an invisible image of the banknote.

The above pieces of information are acquirable, for example, from image data of the banknote (the data may be data generated by the image acquisition unit 402) by an ordinary technique.

The extraction unit 501, based on data acquired by the magnetic detection unit, the thickness detection unit, the fluorescence detection unit, the phosphorescence detection unit, or another unit of the terminal device 400, may further extract (acquire) information (characteristics of the features) on the banknote.

The determination unit 502 may determine whether or not a banknote is a circulation-unsuitable banknote by matching the serial number information about the banknote extracted by the extraction unit 501 against serial number information about circulation-unsuitable banknotes stored in the storage unit 503. In other words, if finding a match from the serial numbers of the circulation-unsuitable banknotes stored in the storage unit 503, then the determination unit 502 may determine the banknote to be a circulation-unsuitable banknote. Meanwhile, if finding no match from the serial numbers of the circulation-unsuitable banknotes stored in the storage unit 503, then the determination unit 502 may determine the banknote not to be a circulation-unsuitable banknote.

Also, the determination unit 502 may respectively match the country information, denomination information, face/back information, serial number information, and serial number font information about the banknote extracted by the extraction unit 501 against country information, denomination information, face/back information, serial number information, and serial number font information about circulation-unsuitable banknotes stored in the storage unit 503. If finding a circulation-unsuitable banknote with all these pieces of information matched, then the determination unit 502 may determine the banknote to be a circulation-unsuitable banknote. If finding no circulation-unsuitable banknote with all these pieces of information matched, then the determination unit 502 may determine the banknote not to be a circulation-unsuitable banknote. The information to be matched may further include feature amount information in an image.

The determination unit 502, based on the magnetism or thickness feature, fluorescence feature, and phosphorescence feature of a banknote, may execute determination processing of determining whether or not the banknote is a circulation-unsuitable banknote.

If the determination unit 502 has determined the banknote to be a circulation-unsuitable banknote X based on the image data, then the information on the circulation-unsuitable banknote X is registered in the storage unit 503 under the control of the control unit 505.

The storage unit 503 stores pieces of information on circulation-unsuitable banknotes grouped into a plurality of groups which have been acquired as described above. The information on a circulation-unsuitable banknote stored in the storage unit 503 may include: (1) information on the circulation-unsuitable banknote itself; and (2) information associated with the circulation-unsuitable banknote.

(1) Information on the circulation-unsuitable banknote itself is information acquirable from the banknote itself and may include at least one of (1-1) country information about the circulation-unsuitable banknote, (1-2) denomination information about the circulation-unsuitable banknote, (1-3) face/back information about the circulation-unsuitable banknote, or (1-4) serial number information about the circulation-unsuitable banknote, or may include all of these pieces of information. These pieces of information are acquirable by the extraction unit 501.

(2) Information associated with the circulation-unsuitable banknote is not information acquired from the banknote itself but is information relating to the banknote and may include at least one of (2-1) date and time information about detection (image capturing) of the circulation-unsuitable banknote by the terminal device 400 (information indicating the date and time), (2-2) location information about detection (image capturing) of the circulation-unsuitable banknote by the terminal device 400 (information indicating the location), or (2-3) factor information about detection of the circulation-unsuitable banknote by the server 500 (information indicating the factor). The date and time information is acquirable from the RTC unit. The location information is acquirable from the location detection unit. The factor information is information indicating the reason why a banknote has been determined as a circulation-unsuitable banknote, i.e., information corresponding to the type of circulation-unsuitable banknote. Specific examples thereof include fake notes, suspect notes, and stolen banknotes.

(2) Information associated with the circulation-unsuitable banknote may also include at least one of (2-4) age information about the user of the circulation-unsuitable banknote (information indicating the age of the user) or (2-5) appearance feature information about the user of the circulation-unsuitable banknote (information indicating the appearance of the user). Examples of the appearance feature of the user include gender, height, body shape, skin color, and hair color. These pieces of information are acquirable from, for example, security camera footage of the user or information input at a POS cash register.

The receiving unit 506 is connected to a communication network to receive information by wired communications and includes a network interface card and the like. A variety of information (data) received by the receiving unit 506 is, for example, stored in the storage unit 503 under the control of the control unit 505. The transmission unit 504 and the receiving unit 506 may be, for example, integrally formed as a communication unit by a network interface card.

The storage unit 503 stores the pieces of information on circulation-unsuitable banknotes grouped into a plurality of groups acquired as described above as a list (table), for example. If the determination unit 502 has determined a banknote to be a circulation-unsuitable banknote, then the server 500 (control unit 505) may update the list based on the information on the circulation-unsuitable banknote. The transmission unit 504 of the server 500, based on the updated list, may transmit a specific group of information on circulation-unsuitable banknote(s) to terminal device(s) 400B satisfying the predetermined condition.

The list possibly stored in the storage unit 503 may be one as shown in FIG. 7 as in the first embodiment. In other words, a list (main list) of circulation-unsuitable banknote stored in (managed in) the storage unit 503 may include, for example, row items each indicating the serial number, denomination, group, and presence or absence of dye ink of the circulation-unsuitable banknote (as shown on the left side of FIG. 7).

In a case where there are circulation-unsuitable banknotes that are the same in serial number, denomination, group, and presence/absence of a dye ink, a sub-list of these circulation-unsuitable banknotes may be stored in (managed in) the storage unit 503 (as shown on the right side of FIG. 7). The sub-list may include, for example, items indicating the serial number of the circulation-unsuitable banknote, the date, time, and location (latitude and longitude) of detection of the circulation-unsuitable banknote, and the factor of detection of the circulation-unsuitable banknote. Each sub-list is stored in the storage unit 503 in relation to the information on the corresponding circulation-unsuitable banknote in the main list.

The predetermined condition (coverage range) based on which whether or not a specific group of information on circulation-unsuitable banknote(s) is to be transmitted is determined may be, for example, (1) area, (2) installation store, or (3) distance, of other terminal devices 400. This allows more effective reduction in risk that the user of a terminal device 400B that has received a specific group of information on circulation-unsuitable banknote(s) receives a circulation-unsuitable banknote.

In other words, in the case of the condition (1), the transmission unit 504 of the server 500 may transmit a specific group of information on circulation-unsuitable banknote(s) to terminal device(s) 400B located in an area (the same area) where a terminal device 400A has detected (captured an image of) the circulation-unsuitable banknote. Examples of the area include regions, counties, states, provinces, cities, towns, and villages.

Alternatively, the transmission unit 504 of the server 500 may transmit a specific group of information on circulation-unsuitable banknote(s) to terminal device(s) 400B located within a predetermined range (predetermined area) regardless of the location where the terminal device 400A has detected (captured an image of) the circulation-unsuitable banknote. Examples of the predetermined area include regions, counties, states, provinces, cities, towns, and villages.

Also, in the case of the condition (2), the transmission unit 504 of the server 500 may transmit a specific group of information on circulation-unsuitable banknote(s) to terminal device(s) 400B at store(s) having a partnership with the store where the terminal device 400A has detected (captured an image of) the circulation-unsuitable banknote.

In the case of the condition (2), the store(s) having a partnership may be store(s) belonging to the same group (e.g., the same company or a company in the same group).

In the case of the condition (3), the transmission unit 504 of the server 500 may transmit a specific group of information on circulation-unsuitable banknote(s) to terminal device(s) 400B located within a predetermined distance from the location where the terminal device 400A has detected (captured an image of) the circulation-unsuitable banknote.

In the case of the condition (3), whether or not terminal device(s) 100B is within a predetermined distance is determinable based on, for example, the location information acquired by the location detection units of the terminal devices 400A and 400B.

These conditions may be appropriately combined by the AND condition or the OR condition.

Examples of the timing when a specific group of information on circulation-unsuitable banknote(s) is transmitted (distributed) include (1) immediately after detection and (2) after a lapse of a predetermined period of time from the detection.

In other words, in the case of the timing (1), the transmission unit 504 of the server 500 may transmit a specific group of information on circulation-unsuitable banknote(s) every time the terminal device 400A detects (captures an image of) a circulation-unsuitable banknote. This allows a terminal device 400B satisfying the predetermined condition to rapidly receive a specific group of information on circulation-unsuitable banknote(s), thus allowing more effective reduction in risk that the user of the terminal device 400B receives a circulation-unsuitable banknote.

In the case of the timing (1), the expression "transmit . . . every time the terminal device 400A detects a circulation-unsuitable banknote" means that the processings from when the terminal device 400A has transmitted image data of the banknote to the server 500 to when the server 500 transmits a specific group of information on circulation-unsuitable banknote(s) are executed without interruption during an intentionally preset predetermined period of time. Thus, the expression possibly encompasses, for example, cases where unintentional delay of the processing occurs due to congestion in the communication network.

Also, in the case of the timing (2), the transmission unit 504 of the server 500 may transmit a specific group of information on circulation-unsuitable banknote(s) after a lapse of a predetermined period of time from when the terminal device 400A has detected (captured an image of) a circulation-unsuitable banknote. This allows, in a case where circulation-unsuitable banknotes in the same group have been detected within a predetermined period of time, transmission of pieces of information on circulation-unsuitable banknotes in the group collectively to terminal device(s) 400B, thus reducing processing load related to distribution and update of information in the entire system. For example, pieces of information on circulation-unsuitable banknotes in the same group detected in the same city as the location (e.g., store) where a circulation-unsuitable banknote has been detected (an image of the circulation-unsuitable banknote has been captured) and in neighboring city(ies) within a predetermined period of time may be collectively distributed to terminal device(s) 400B.

Also, in the case of the timing (2), the beginning of the predetermined period of time may be, for example, the date and time of detection by the terminal device 400A (the date and time on which the image acquisition unit 402 has captured an image of the banknote or the date and time on which the transmission unit 401 has transmitted image data of the banknote to the server 500) or date and time on which the server 500 has detected the banknote (the date and time on which the determination unit 502 has determined the banknote to be a circulation-unsuitable banknote or the date and time on which the information on the circulation-unsuitable banknote was stored (registered) in the storage unit 503). The end of the predetermined period of time may be the current date and time.

In the case of the timing (2), the predetermined period of time may be set in consideration of a time difference in cases of wide areas (e.g., Europe, the United States, Russia).

Examples of the specific group of information on circulation-unsuitable banknote(s) (the contents to be distributed) from the server 500 include the information on a circulation-unsuitable banknote possibly stored in the storage unit 503.

The storage unit 503 of the server 500 may store the settings for distribution. If a determination unit 502 has determined the banknote to be a circulation-unsuitable banknote X based on the image data transmitted from the terminal device 400A, then the transmission unit 504 of the server 500 may transmit (distribute) a specific group of information on circulation-unsuitable banknote(s) to other terminal device(s) 400B based on the stored settings for distribution. In other words, if the determination unit 502 has determined the banknote to be a circulation-unsuitable banknote X, then the control unit 505 may execute, based on the settings for distribution, transmission processing of transmitting a specific group of information on circulation-unsuitable banknote(s) to other terminal device(s) 400B via the transmission unit 504.

The settings for distribution mean information including the timing of distribution, contents to be distributed, and the range of distribution (e.g., when and to where what is to be distributed). The settings for distribution may be set for each user, for each area, or for each model of terminal devices 400.

Figure 21:
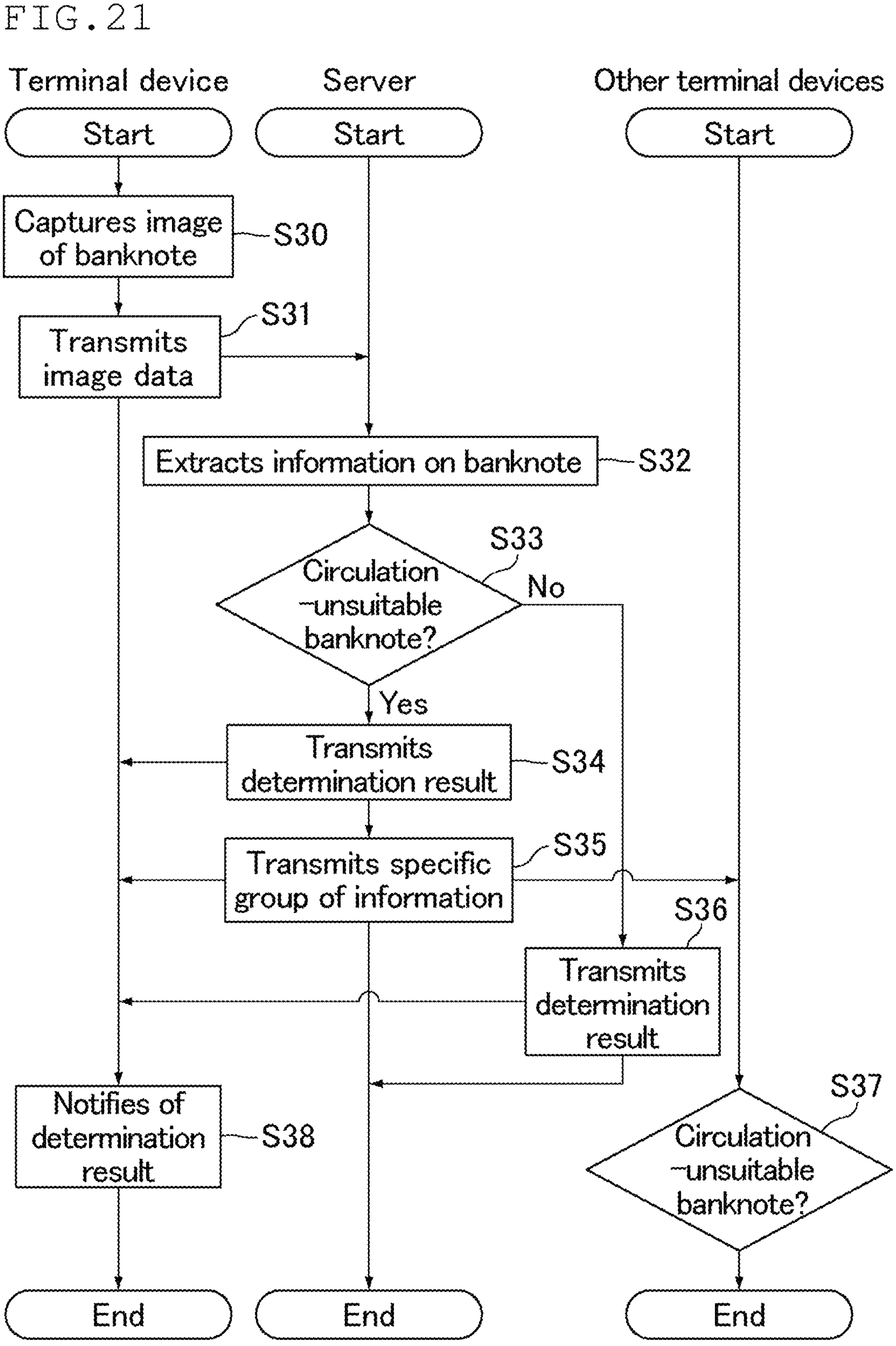
FIG. 21 is a flowchart showing another example of the operation of the banknote monitoring system according to the fourth embodiment.

Next, with reference to FIG. 21, the operation of the banknote monitoring system according to the present embodiment including the terminal devices and the server shown in FIGS. 19 and 20 is described. FIG. 21 is a flowchart showing another example of the operation of the banknote monitoring system according to the fourth embodiment.

As shown in FIG. 21, first, the image acquisition unit 402 of a terminal device 400 captures an image of a banknote (step S30).

Next, the terminal device 400 executes the processing of step S31 as in the case shown in FIG. 18. Meanwhile, the server 500 executes the processings of steps S32 to S36 as in the case shown in FIG. 18. In step S35, the transmission unit 504 of the server 500 may transmit a specific group of information on circulation-unsuitable banknote(s) to the terminal device 400 having transmitted the image data as well as other terminal device(s) 400 satisfying the predetermined condition.

Next, based on the transmitted specific group of information on circulation-unsuitable banknote(s), the user of any of the other terminal devices 400 satisfying the predetermined condition and having received the specific group of information on circulation-unsuitable banknote(s) determines whether or not a banknote is a circulation-unsuitable banknote by, for example, visual check (step S37).

If any of the other terminal devices 400 has received a specific group of information on circulation-unsuitable banknote(s) from the server 500, then the notification unit 406 of the terminal device 400 may notify the user of the terminal device 400 of reception of the information.

If in step S34 or S36 the server 500 transmits the determination result by the determination unit 502 to the terminal device 400 that has transmitted the image data, then the notification unit 406 of the terminal device 400 notifies the user of the result, i.e., whether or not the banknote is a circulation-unsuitable banknote (step S38). This completes the operation of the system 4.

Fifth Embodiment

Figure 22:
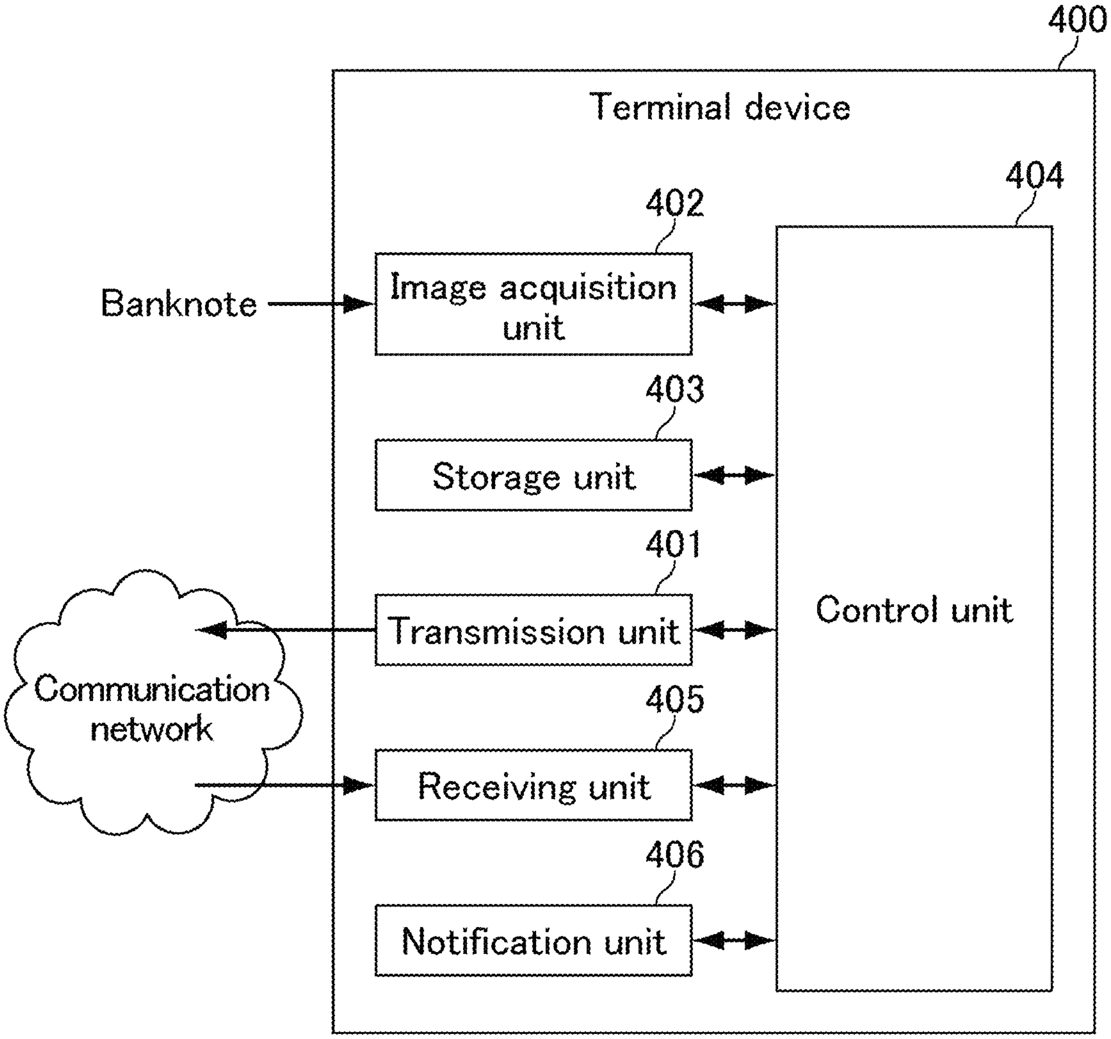
FIG. 22 is a block diagram showing the configuration of a terminal device according to a fifth embodiment.
Figure 23:
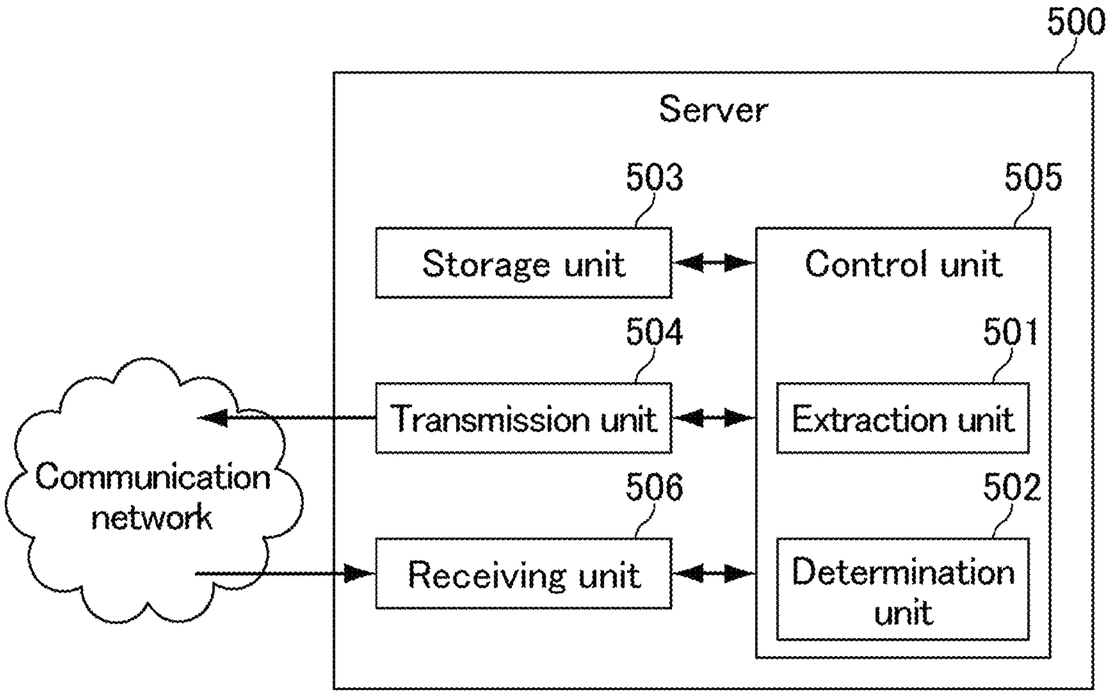
FIG. 23 is a block diagram showing the configuration of a server according to the fifth embodiment.

The present embodiment is substantially the same as the fourth embodiment, except that the concept of rankings is introduced to information on a circulation-unsuitable banknote. The rankings are updatable. The server operates based on the latest rankings. FIG. 22 is a block diagram showing the configuration of a terminal device according to the fifth embodiment. FIG. 23 is a block diagram showing the configuration of a server according to the fifth embodiment.

As shown in FIG. 22, in the present embodiment, each terminal device 400, as in the fourth embodiment, may further include the image acquisition unit 402, the storage unit 403, the control unit (arithmetic processing unit) 404, the receiving unit 405, and the notification unit 406, as well as the transmission unit 401.

As shown in FIG. 23, in the present embodiment, the server 500, as in the fourth embodiment, may further include the control unit (arithmetic processing unit) 505 and the receiving unit 506, as well as the extraction unit 501, the determination unit 502, the storage unit 503, and the transmission unit 504.

Meanwhile, the present embodiment is different from the fourth embodiment in that the server 500 (control unit 505) ranks the pieces of information on circulation-unsuitable banknotes under the management. Specifically, the server 500 ranks the grouped pieces of information on circulation-unsuitable banknotes stored in the storage unit 503 by risk levels. As a result, in the storage unit 503, grouped pieces of information on circulation-unsuitable banknotes ranked by risk levels are stored. This allows selective transmission of information on a circulation-unsuitable banknote which is ranked high, i.e., with a high risk level, to other terminal device(s) 400. This allows effective reduction in risk that the user of the other terminal device(s) 400 receives a circulation-unsuitable banknote while further reducing memory consumption in the other terminal device(s) 400.

As described above, if the determination unit 502 has determined a banknote to be a circulation-unsuitable banknote based on image data transmitted from a terminal device 400, then the transmission unit 504 of the server 500 may transmit information on circulation-unsuitable banknotes belonging to a specific group including the circulation-unsuitable banknote and being ranked higher than a predetermined rank to other terminal device(s) 400. In other words, if the determination unit 502 has determined a banknote to be a circulation-unsuitable banknote, then the control unit 505 may execute transmission processing of transmitting information on circulation-unsuitable banknotes belonging to a specific group including the circulation-unsuitable banknote and being ranked higher than a predetermined rank to other terminal device(s) 400 via the transmission unit 504. The information on circulation-unsuitable banknotes ranked higher than a predetermined rank may be transmitted to the terminal device 400 having transmitted the image data as well as the other terminal device(s) 400.

The higher the risk level, the higher the information on a banknote is ranked, while the lower the risk level, the lower the information on a banknote is ranked. The transmission unit 504 of the server 500 may or may not transmit information on a circulation-unsuitable banknote in the same rank as the predetermined rank to the other terminal devices 400. This condition is appropriately settable according to the value of the predetermined rank.

The storage unit 503 of the server 500 may store settings for ranking which are information including rules for ranking, and the server 500 (control unit 505) may rank pieces of information on circulation-unsuitable banknotes (e.g., list of counterfeit notes acquired from the central bank) stored in the storage unit 503 or received from various parties by risk levels based on the settings for ranking. The settings for ranking may be set for each user or for each area.

The server 500 (control unit 505) may group pieces of information on circulation-unsuitable banknotes by case and rank the pieces of information by risk levels. In other words, the grouped pieces of information on circulation-unsuitable banknotes stored in the storage unit 503 may be grouped by case and ranked by risk levels. For example, the larger the amount of lost money and/or the number of lost banknotes in the case, the higher the server 500 (control unit 505) may rank the information. Also, the closer the location and/or date and time of the case, the higher the server 500 may rank the information. The larger the criminal organization that has caused the case (or more heinous or more vicious the case), the higher the server 500 may rank the information.

The server 500 (control unit 505) may also rank pieces of information on circulation-unsuitable banknotes by the amount and/or number of circulation-unsuitable banknotes. In other words, the grouped pieces of information on circulation-unsuitable banknotes stored in the storage unit 503 may be ranked by at least one of the amount or number of circulation-unsuitable banknotes.

Furthermore, the server 500 (control unit 505) may group the pieces of information on circulation-unsuitable banknotes by case and rank the pieces of information by at least one of the amount or number of circulation-unsuitable banknotes. In other words, the grouped pieces of information on circulation-unsuitable banknotes stored in the storage unit 503 may be grouped by case and ranked by at least one of the amount or number of circulation-unsuitable banknotes.

The server 500 (control unit 505) may, for example, rank each of the grouped pieces of information on circulation-unsuitable banknotes by ranking a group high if the corresponding case is accompanied by a large amount and/or large number of circulation-unsuitable banknotes, ranking a group middle if the corresponding case is accompanied by a moderate amount and/or moderate number of circulation-unsuitable banknotes, and ranking a group low if the corresponding case is accompanied by a small amount and/or small number of circulation-unsuitable banknotes. This is because the larger the amount and/or number of banknotes, the higher the likelihood that the banknotes are circulated and the higher the likelihood that the case is caused by a large organization.

If the determination unit 502 has determined a banknote to be a circulation-unsuitable banknote based on image data transmitted from a terminal device 400, then the server 500 (control unit 505) may raise the rank of the specific group of information on circulation-unsuitable banknote(s) to which the circulation-unsuitable banknote corresponds in terms of risk levels to a higher rank. This allows effective reduction in risk that the user of a terminal device 400 receives a circulation-unsuitable banknote. For example, if a counterfeit note has been detected, then the rank of a specific group of information on circulation-unsuitable banknote(s) to which the counterfeit note corresponds is raised because the likelihood seems to be high that counterfeit notes in the specific group are thereafter used at other stores or in other areas.

If image data of a suspect note has been transmitted from a mobile terminal device among terminal devices 400 and thereafter the banknote has been determined to be a counterfeit note, then the server 500 (control unit 505) may count the amount and/or number of the counterfeit note(s), rank the information on the counterfeit note(s), and raise the rank of the information according to an increase in the accumulated amount and/or number.

The server 500 (control unit 505) may lower the rank of a group of information on circulation-unsuitable banknote(s) to a lower rank as the case related to the group becomes older. For example, after one year has passed from when the first counterfeit note has been detected, the likelihood is low that such counterfeit notes are still used. Thus, the rank of the information on circulation-unsuitable banknotes in the corresponding group may be lowered by one rank.

In the present embodiment, the range (predetermined condition) of distribution, timing of distribution, and contents to be distributed, of a specific group of information on circulation-unsuitable banknote(s) are the same as in the fourth embodiment.

For example, the storage unit 503 of the server 500 may store settings for distribution for each user or for each area, based on which the transmission unit 504 (control unit 505) of the server 500 may transmit (distribute) a specific group of information on circulation-unsuitable banknote(s) to other terminal devices 400.

Also, for example, if a counterfeit note has been newly detected and the rank of a specific group of information on counterfeit notes including the counterfeit note is raised to a rank higher than the predetermined rank, then the specific group of information on counterfeit notes may be transmitted (distributed) to users in the same city as the city where the counterfeit note has been detected.

In addition, in a case where a preranked list is stored in the storage unit 503, if a circulation-unsuitable banknote the information on which is ranked higher than a predetermined rank has been detected, then the list may be transmitted (distributed) to all users in the same city as the city where the circulation-unsuitable banknote has been detected and in neighboring city(ies).

In the present embodiment, the range (predetermined condition) of distribution, particularly the area of distribution, of a specific group of information on circulation-unsuitable banknote(s) may be changed according to the rank. In other words, the higher the rank of the information on a circulation-unsuitable banknote, the wider the area where the transmission unit 504 of the server 500 may transmit (distribute) the information to other terminal devices 400.

For example, if information on a suspect note has been transmitted from a terminal device 400 and thereafter the banknote has been determined to be a counterfeit note, then the server 500 (control unit 505) may determine the area where the information is to be transmitted (distributed) according to the rank of a specific group of information on circulation-unsuitable banknote(s) to which the counterfeit note corresponds. Specifically, for example, information may be transmitted to a wide range (wide area, e.g., all over the country) if ranked high, may be transmitted to a middle range (moderate area, i.e., regions, counties) if ranked middle, and may be transmitted to a narrow range (narrow area, i.e., states, provinces, cities, towns, villages) if ranked low.

Figure 24:
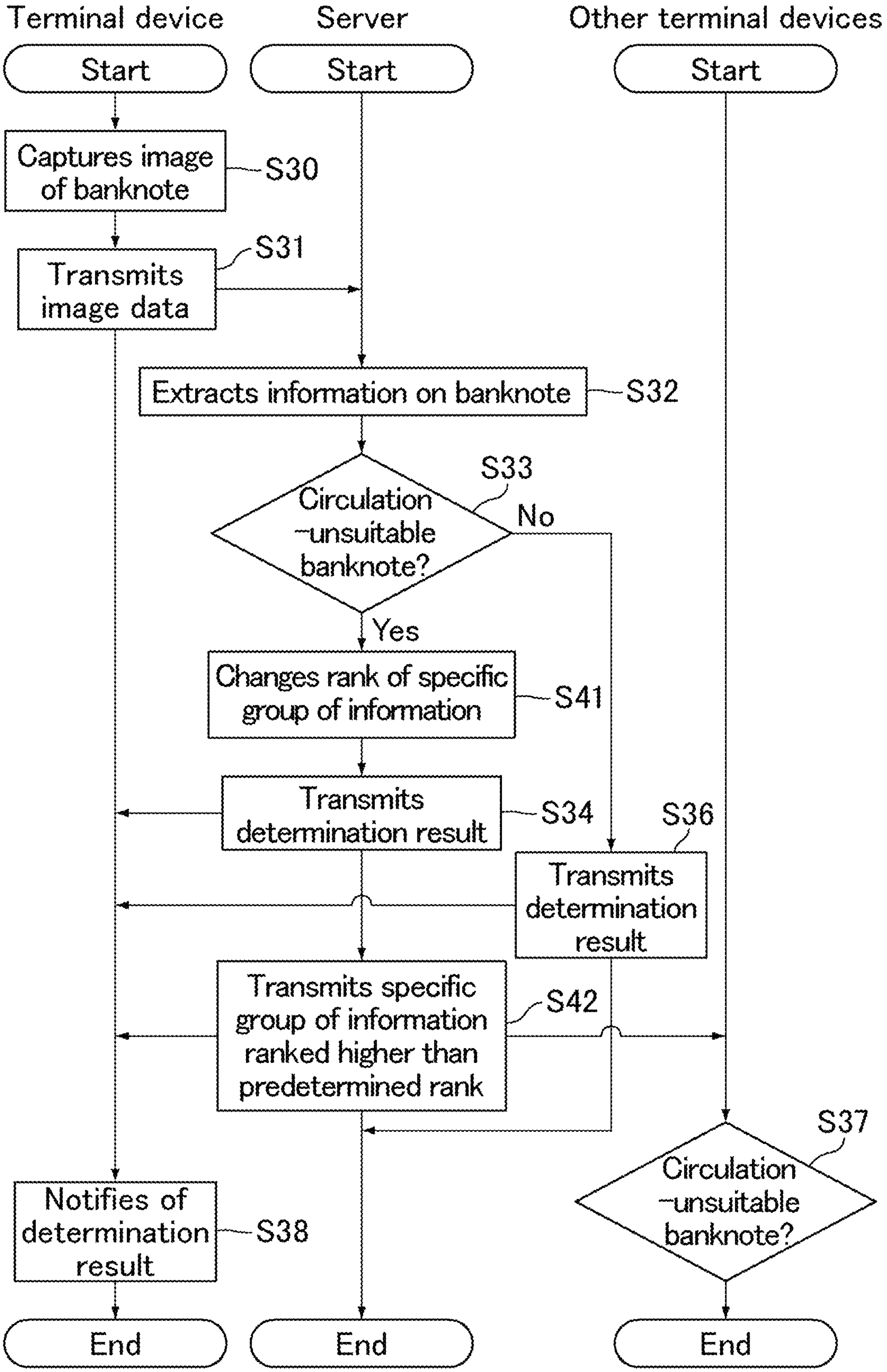
FIG. 24 is a flowchart showing an example of the operation of the banknote monitoring system according to the fifth embodiment.

Next, with reference to FIG. 24, the operation of the banknote monitoring system according to the present embodiment is described. FIG. 24 is a flowchart showing an example of the operation of the banknote monitoring system according to the fifth embodiment.

As shown in FIG. 24, first, a terminal device 400 executes the processings of steps S30 and S31 as in the fourth embodiment. Meanwhile, the server 500 executes the processings of steps S32 and S33 as in the fourth embodiment.

Next, if in step S33 the determination unit 502 of the server 500 has determined a banknote to be a circulation-unsuitable banknote (step S33: Yes), then the server 500 (control unit 505) raises the rank of the specific group of information on circulation-unsuitable banknote(s) to which the circulation-unsuitable banknote, whose information has been transmitted from the terminal device 400, corresponds in terms of risk levels to a higher rank (step S41).

Next, the transmission unit 504 of the server 500 transmits the determination result in step S33 to the terminal device 400 having transmitted the image data (step S34), and then transmits information on circulation-unsuitable banknotes belonging to a specific group and being ranked higher than a predetermined rank to the terminal device 400 having transmitted the image data and to other terminal devices 400 (step S42).

If in step S33 the banknote has been determined not to be a circulation-unsuitable banknote (step S33: No), then the transmission unit 504 of the server 500 transmits the determination result to the terminal device 400 having transmitted the image data (step S36).

Next, as in the case shown in FIG. 21, the user of any of the other terminal devices 400 (e.g., mobile terminal) satisfying the predetermined condition and having received the specific group of information on circulation-unsuitable banknote(s) determines whether or not a banknote is a circulation-unsuitable banknote by, for example, visual check (step S37).

If any of the other terminal devices 400 has received a specific group of information on circulation-unsuitable banknote(s) from the server 500, then the notification unit 406 of the terminal device 400 may notify the user of the terminal device 400 of reception of the information.

Also, as in the case shown in FIG. 21, if in step S34 or S36 the server 500 has transmitted the determination result by the determination unit 502 to the terminal device 400 having transmitted the image data, then the terminal device 400 executes the processing of step S38. This completes the operation of the system according to the present embodiment.

As described above, in the embodiments, whether or not a valuable medium is a circulation-unsuitable medium is determined in a terminal device or the server based on image data and, if the medium has been determined to be a circulation-unsuitable medium, then a specific group of information on circulation-unsuitable media including the circulation-unsuitable medium is transmitted to other mobile terminal devices satisfying the predetermined condition. This configuration allows simple, efficient detection of a circulation-unsuitable medium while reducing the system load.

Hereinafter, modified examples of the embodiments are described.

In the above embodiments, an incentive may be given to the provider of the information on a circulation-unsuitable banknote (the user of the terminal device that first acquired image data of the banknote in a case where the banknote is a circulation-unsuitable banknote). This may be a motivational factor in introducing the system (service). Also, if a circulation-unsuitable banknote has been detected (excluded) based on the information on a circulation-unsuitable banknote provided by the information provider, an incentive may be given to the provider. This may also be a motivational factor in introducing the system (service).

In the above embodiments, the processing executed by the control unit may utilize an artificial intelligence (AI) learning model.

As descried above, the embodiments of the present disclosure have been described with reference to the drawings. The present disclosure is not limited to these embodiments. The structures of the embodiments may be combined or modified as appropriate within the spirit of the present disclosure.

As described above, the present disclosure provides a technique useful in simply, efficiently detecting a circulation-unsuitable medium while reducing the system load.

What is claimed is:

1. A valuable-medium monitoring system for detecting a circulation-unsuitable medium that is a valuable medium unsuitable for circulation as being involved in crime, the valuable-medium monitoring system comprising:

- a plurality of terminal devices; and
- a server configured to transmit information to and receive information from the plurality of terminal devices, wherein
- each terminal device of the plurality of terminal devices comprises:
  - a controller configured to extract information on a valuable medium and determine whether or not the valuable medium is a circulation-unsuitable medium based on the extracted information on the valuable medium; and
  - a transmitter configured to, in response to a determination by the controller that the valuable medium is a circulation-unsuitable medium, transmit information on the circulation-unsuitable medium to the server, and
- the server comprises:
  - a memory and memory configured to store pieces of information on a plurality of circulation-unsuitable media, the pieces of information being grouped into a plurality of groups; and
  - a transmitter configured to, in response to transmission of information on a circulation-unsuitable medium from one of the plurality of terminal devices, transmit a specific group of information on a circulation-unsuitable medium to which the circulation-unsuitable medium corresponds to any other of the plurality of terminal devices satisfying a predetermined condition.

2. The valuable-medium monitoring system according to claim 1, wherein the information on the valuable medium extracted by the controller includes at least one of country information, type information, face/back information, feature amount information included in image data, serial number information, or serial number font information, each of these pieces of information being about the valuable medium.

3. The valuable-medium monitoring system according to claim 1, wherein the information on the circulation-unsuitable medium includes information on the circulation-unsuitable medium itself.

4. The valuable-medium monitoring system according to claim 3, wherein the information on the circulation-unsuitable medium itself includes at least one of country information, type information, face/back information, or serial number information, each of these pieces of information being about the circulation-unsuitable medium.

5. The valuable-medium monitoring system according to claim 1, wherein the information on the circulation-unsuitable medium includes information associated with the circulation-unsuitable medium.

6. The valuable-medium monitoring system according to claim 5, wherein the information associated with the circulation-unsuitable medium includes at least one of date and time information, location information, or factor information, each of these pieces of information being about detection of the circulation-unsuitable medium by the one terminal device.

7. The valuable-medium monitoring system according to claim 5, wherein the information associated with the circulation-unsuitable medium includes at least one of age information or appearance feature information about a user of the circulation-unsuitable medium.

8. The valuable-medium monitoring system according to claim 1, wherein the transmitter of the server transmits the specific group of information on a circulation-unsuitable medium to any of the plurality of terminal devices located in an area where the one terminal device has detected the circulation-unsuitable medium.

9. The valuable-medium monitoring system according to claim 1, wherein the transmitter of the server transmits the specific group of information on a circulation-unsuitable medium to any of the plurality of terminal devices located at a store having a partnership with a store where the one terminal device has detected the circulation-unsuitable medium.

10. The valuable-medium monitoring system according to claim 1, wherein the transmitter of the server transmits the specific group of information on a circulation-unsuitable medium to any of the plurality of terminal devices located within a predetermined distance from a location where the one terminal device has detected the circulation-unsuitable medium.

11. The valuable-medium monitoring system according to claim 1, wherein the transmitter of the server transmits the specific group of information on a circulation-unsuitable medium every time the one terminal device detects the circulation-unsuitable medium or after a lapse of a predetermined period of time from when the one terminal device has detected the circulation-unsuitable medium.

12. The valuable-medium monitoring system according to claim 1, wherein the pieces of information on the plurality of circulation-unsuitable media stored in the memory and grouped into the plurality of groups are ranked by risk levels.

13. The valuable-medium monitoring system according to claim 12, wherein the pieces of information on the plurality of circulation-unsuitable media stored in the memory and grouped into the plurality of groups are grouped by case and ranked.

14. The valuable-medium monitoring system according to claim 12, wherein in response to transmission of information on the circulation-unsuitable medium from the one terminal device, the server raises the rank of the specific group of information on a circulation-unsuitable medium in terms of risk levels to a higher rank.

15. The valuable-medium monitoring system according to claim 12, wherein in response to transmission of information on the circulation-unsuitable medium from the one terminal device, the transmitter of the server transmits information on a circulation-unsuitable medium belonging to the specific group and being ranked higher than a predetermined rank.

16. The valuable-medium monitoring system according to claim 1, wherein the server is a cloud server.

17. A valuable-medium monitoring method for detecting a circulation-unsuitable medium that is a valuable medium unsuitable for circulation as being involved in crime, the valuable-medium monitoring method comprising:

in one terminal device, extracting information on a valuable medium, determining whether or not the valuable medium is a circulation-unsuitable medium based on the extracted information on the valuable medium; and in response to a determination that the valuable medium is a circulation-unsuitable medium, transmitting information on the circulation-unsuitable medium to a server, and in the server, storing pieces of information on a plurality of circulation-unsuitable media, the pieces of information being grouped into a plurality of groups; and transmitting a specific group of information on a circulation-unsuitable medium to which the information on the circulation-unsuitable medium transmitted by the one terminal device corresponds to another terminal device satisfying a predetermined condition.

18. A server that transmits information to and receives information from a plurality of terminal devices for detecting a circulation-unsuitable medium that is a valuable medium unsuitable for circulation as being involved in crime, the server comprising:

a memory configured to store pieces of information on a plurality of circulation-unsuitable media, the pieces of information being grouped into a plurality of groups; and a transmitter configured to, in response to transmission of information on a circulation-unsuitable medium from one of the plurality of terminal devices, transmit a specific group of information on a circulation-unsuitable medium to which the circulation-unsuitable medium corresponds to any other of the plurality of terminal devices satisfying a predetermined condition.

19. A valuable-medium monitoring system for detecting a circulation-unsuitable medium that is a valuable medium unsuitable for circulation as being involved in crime, the valuable-medium monitoring system comprising:

a plurality of terminal devices; and a server configured to transmit information to and receive information from the plurality of terminal devices, wherein each terminal device of the plurality of terminal devices comprises a transmitter configured to transmit image data of a valuable medium to the server, the server comprises:

a controller configured to extract information on the valuable medium from the image data transmitted from each of the plurality of terminal devices and determine whether or not the valuable medium is a circulation-unsuitable medium based on the extracted information on the valuable medium;

a memory configured to store pieces of information on a plurality of circulation-unsuitable media, the pieces of information being grouped into a plurality of groups; and a transmitter configured to, in response to a determination by the controller that the valuable medium is a circulation-unsuitable medium, transmit a specific group of information on a circulation-unsuitable medium to which the circulation-unsuitable medium corresponds to any other of the plurality of terminal devices satisfying a predetermined condition.

* * * * *